United States Patent
Brown et al.

(10) Patent No.: US 9,631,268 B2
(45) Date of Patent: Apr. 25, 2017

(54) METHODS AND SYSTEMS FOR SHAPE MEMORY ALLOY STRUCTURES

(71) Applicant: The Boeing Company, Chicago, IL (US)

(72) Inventors: Jonathan K. Brown, Renton, WA (US); Glenn Scott Bushnell, Puyallup, WA (US); Dan J. Clingman, Milton, WA (US)

(73) Assignee: The Boeing Company, Chicago, IL (US)

( * ) Notice: Subject to any disclaimer, the term of this patent is extended or adjusted under 35 U.S.C. 154(b) by 1081 days.

(21) Appl. No.: 13/778,093

(22) Filed: Feb. 26, 2013

(65) Prior Publication Data

US 2016/0083824 A1  Mar. 24, 2016

(51) Int. Cl.
| | | |
|---|---|---|
| C22F 1/00 | (2006.01) | |
| F03G 7/06 | (2006.01) | |
| B21C 37/04 | (2006.01) | |
| B64C 1/06 | (2006.01) | |
| B64C 3/18 | (2006.01) | |
| B64C 1/00 | (2006.01) | |

(52) U.S. Cl.
CPC ............ *C22F 1/006* (2013.01); *B21C 37/045* (2013.01); *B64C 1/065* (2013.01); *B64C 3/185* (2013.01); *F03G 7/065* (2013.01); *B64C 2001/0081* (2013.01)

(58) Field of Classification Search
None
See application file for complete search history.

(56) References Cited

U.S. PATENT DOCUMENTS

| | | | |
|---|---|---|---|
| 4,046,236 A | 9/1977 | Hershman et al. | |
| 4,691,517 A * | 9/1987 | Banks | F03G 7/065 60/527 |
| 4,965,545 A | 10/1990 | Johnson | |
| 6,065,934 A | 5/2000 | Jacot et al. | |
| 6,499,952 B1 | 12/2002 | Jacot et al. | |
| 6,746,552 B2 * | 6/2004 | Homma | F03G 7/065 148/402 |
| 7,037,076 B2 | 5/2006 | Jacot et al. | |
| 7,516,680 B2 | 4/2009 | Clingman et al. | |
| 7,665,300 B2 * | 2/2010 | Biggs | H01H 1/0036 60/528 |
| 7,771,392 B2 | 8/2010 | De Polo et al. | |
| 8,172,811 B2 | 5/2012 | Roe | |
| 2002/0195177 A1 | 12/2002 | Hinkley et al. | |
| 2007/0074753 A1 | 4/2007 | Altali et al. | |

(Continued)

FOREIGN PATENT DOCUMENTS

EP   2770200 A2   8/2014

OTHER PUBLICATIONS

European Patent Office Examination Report for Counterpart Patent Application No. EP14156758.6-1608, Applicant The Boeing Company, dated Sep. 30, 2015, 3 pages.

(Continued)

*Primary Examiner* — George Wyszomierski

(57) ABSTRACT

There is provided a method of training a shape memory alloy (SMA) workpiece. The method includes applying a force couple to a shape memory alloy (SMA) workpiece to impart a generally planar transformational behavior to the SMA workpiece to obtain a trained shape memory alloy (SMA) workpiece.

20 Claims, 14 Drawing Sheets

(56) References Cited

U.S. PATENT DOCUMENTS

| | | |
|---|---|---|
| 2009/0212158 A1 | 8/2009 | Mabe et al. |
| 2010/0018823 A1 | 1/2010 | Melz et al. |
| 2010/0065679 A1 | 3/2010 | Clingman et al. |
| 2011/0114434 A1 | 5/2011 | Mankame et al. |
| 2012/0193183 A1 | 8/2012 | Gunter et al. |
| 2012/0292155 A1 | 11/2012 | Gunter |

OTHER PUBLICATIONS

European Patent Office Extended European Search Report for Counterpart Patent Application No. EP14156758.6-1608, Applicant The Boeing Company, dated Oct. 14, 2014, 5 pages.

State Intellectual Property Office (SIPO) of the P.R.C., Notification of First Office Action and Search Report (English Version and Chinese Version), Issued Nov. 28, 2016, for related Chinese Application No. 201410051043.2 The Boeing Company, 16 pages.

* cited by examiner

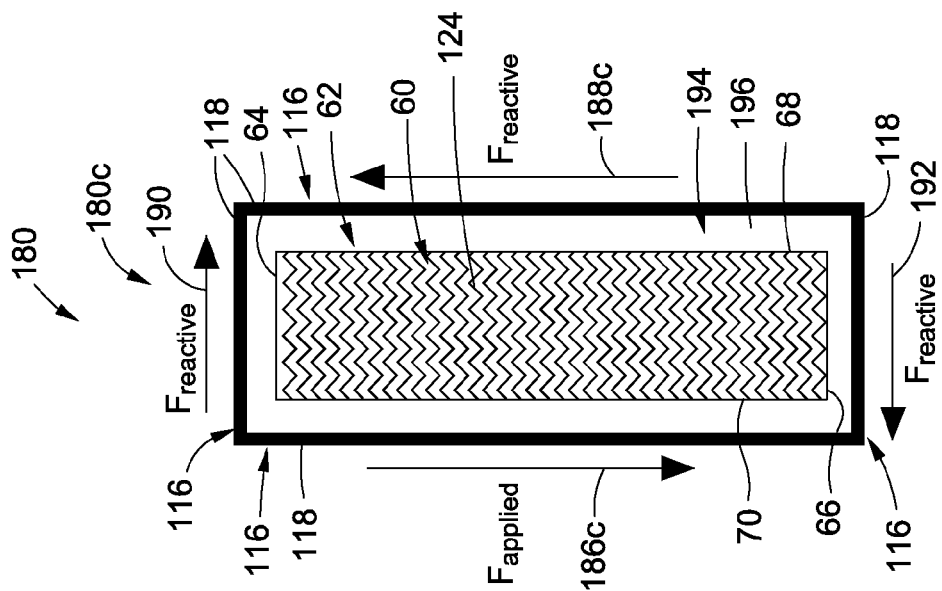
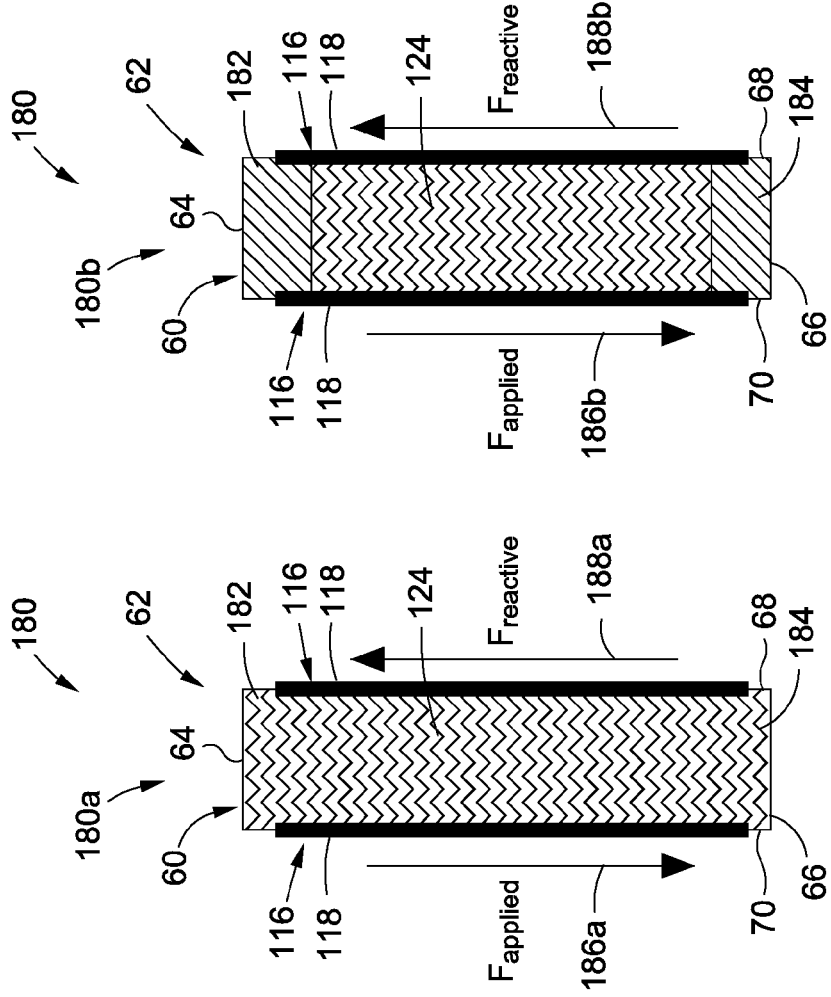

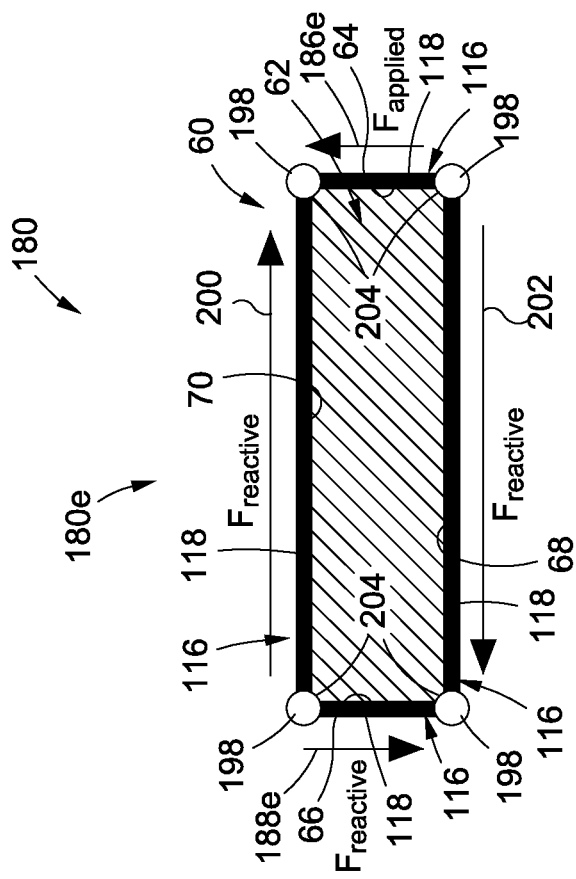
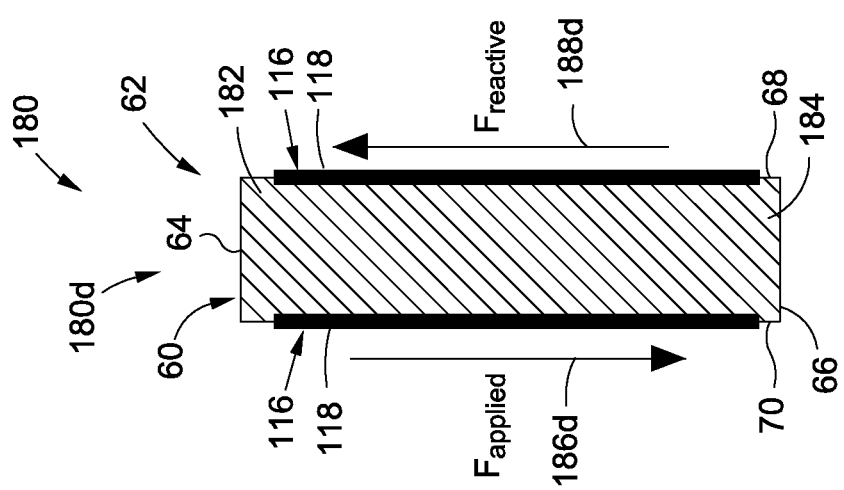
FIG. 7E
FIG. 7D

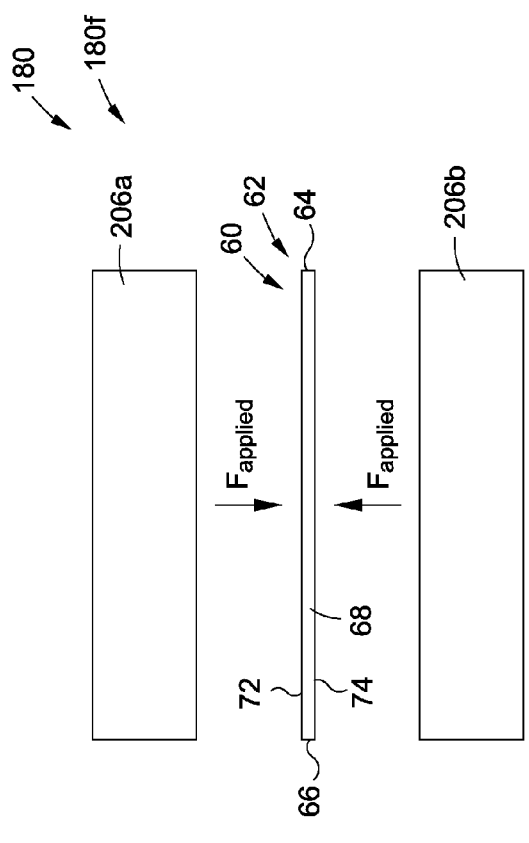
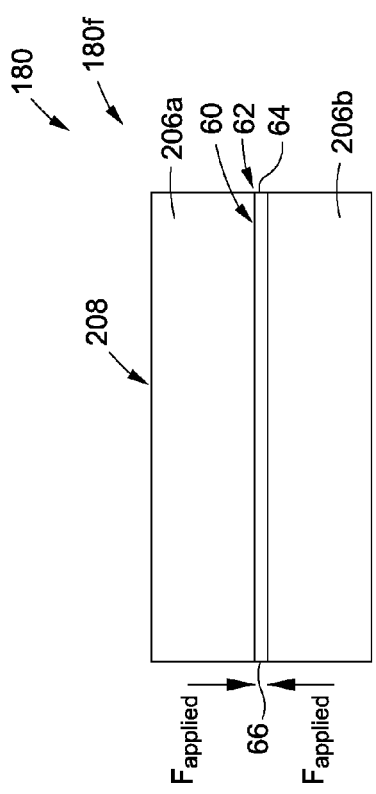
FIG. 7F
FIG. 7G

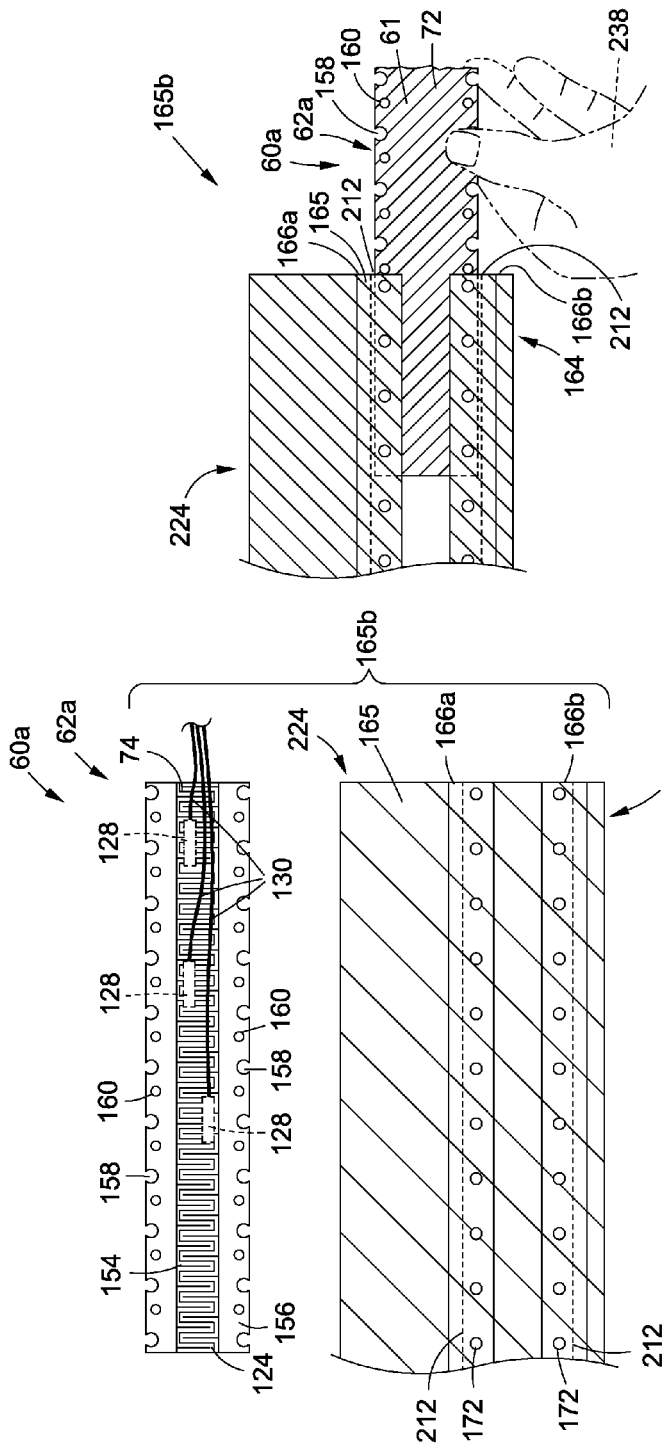

METHODS AND SYSTEMS FOR SHAPE MEMORY ALLOY STRUCTURES

GOVERNMENT LICENSE RIGHTS

This invention was made with government support under DARPA Contract No. HR0011-10-09-001, awarded by the Defense Advanced Research Projects Agency (DARPA) of the United States Department of Defense. The government has certain rights in the invention.

BACKGROUND

1) Field of the Disclosure

The disclosure relates generally to methods and systems for processing shape memory alloy (SMA) material, such that when the SMA is cycled, or transforms, it produces a racking motion. The disclosure further relates to mechanical actuators having shape memory alloys imparted with the racking motion and a method of using the mechanical actuators to influence or warp the shape of a structure such as an airfoil.

2) Description of Related Art

The ability to controllably twist, bend, or deform an aerodynamic surface of an air vehicle, such as a wing of an aircraft, a rotor blade of a rotorcraft, or another aerodynamic surface, during various phases of flight may significantly enhance the performance of the air vehicle. A limitation to implementing known mechanical and/or electromagnetic actuators or other devices that are designed to twist, bend, or deform a wing of an aircraft, a rotor blade of a rotorcraft, or another aerodynamic surface, is that the actuators or other devices used for this purpose must overcome the inherent structural stiffness of the material used to form the wing, rotor blade, or other aerodynamic surface.

Actuators and actuator system components made of shape memory alloys (SMA) and designed for use in air vehicles are known. Shape memory alloys (SMA) are a group of metals that have interesting thermal and mechanical properties. Shape memory alloys can exist in one of several distinct temperature-dependent phases. The most commonly utilized of these phases are the so-called martensite and austenite phases. Upon heating a shape memory alloy through a transformation temperature, the shape memory alloy changes from the martensite phase into the austenite phase. If a component made of a shape memory alloy material, for example, NiTinol, is deformed while in a martensitic state (low yield strength condition) and then heated to its transition temperature to reach an austenitic state, the shape memory alloy material of the component will resume its original (undeformed) shape. The rate of return to the original shape depends upon the amount and rate of thermal energy applied to the component. When heat is removed from the component, it will return to the martensitic state in which the component can again be deformed.

Known limitations of thermo-mechanical processing of SMA actuators and structures may include axially straining, bending strain, torsional straining. Further, known SMA actuator system components for known actuators may include SMA wires that may be trained by pulling, and SMA plates that may be trained by bending. However, actuation or shape control of surfaces by such known SMA actuator system components may be difficult to control. Moreover, the shape and size of such known SMA actuator system components may make it difficult to integrate into known actuators or other types of SMA actuators.

In addition, known SMA actuators may include SMA twist tube actuators that apply forces and torques at one or more discrete locations along an aerodynamic surface and that may be trained by twisting. The SMA material of such known SMA twist tube actuators may have a two-way shape effect to allow the twist tube actuator to twist from an original shape to a trained shape and twist back from the trained shape to the original shape. However, such known SMA twist tube actuators may require two SMA twist tube components which may require electrical power be continuously applied to the heater elements of each SMA member to maintain a specific loaded rotational position. This may add system weight and complexity as well as require excessive power.

Accordingly, there is a need in the art for improved methods and systems for shape memory alloy (SMA) structures that provide advantages over known methods and systems.

SUMMARY

This need for an improved methods and systems for shape memory alloy (SMA) structures is satisfied. As discussed in the below detailed description, embodiments of improved methods and systems for shape memory alloy (SMA) actuators for use in air vehicles may provide significant advantages over known devices, methods, and systems.

In an embodiment of the disclosure, there is provided a method of training a shape memory alloy (SMA) workpiece. The method comprises applying a force couple to the SMA workpiece to impart a generally planar transformational behavior to the SMA workpiece to obtain a trained shape memory alloy (SMA) workpiece.

In another embodiment of the disclosure, there is provided a training system capable of performing work. The training system comprises a shape memory alloy (SMA) actuator exhibiting a generally planar transformational behavior. The training system further comprises one or more heating elements for transforming the SMA actuator from an original shape to a trained shape, thereby performing work.

In another embodiment of the disclosure, there is provided a structure. The structure comprises at least one trained shape memory alloy (SMA) workpiece having a generally planar transformational behavior. The at least one trained SMA workpiece is joined to a structure. The structure is adaptable in response to a change in a temperature of the at least one trained SMA workpiece.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 7A is an illustration of a plan view of an embodiment of a training variant of the disclosure;

FIG. 7B is an illustration of a plan view of another embodiment of a training variant of the disclosure;

FIG. 7C is an illustration of a plan view of yet another embodiment of a training variant of the disclosure;

FIG. 7D is an illustration of a plan view of yet another embodiment of a training variant of the disclosure;

FIG. 7E is an illustration of a plan view of yet another embodiment of a training variant of the disclosure;

FIG. 7F is an illustration of an exploded side view of yet another embodiment of a training variant of the disclosure;

FIG. 7G is an illustration of an assembled side view of the training variant of FIG. 7F of the disclosure;

FIG. 9A is an illustration of an enlarged partial view of one of the embodiments of a composite structure and a trained SMA actuator trained by one of the embodiments of a method of the disclosure and shown prior to mechanical attachment and integration into a structural spar;

FIG. 9B is an illustration of an enlarged partial view of the composite structure and the trained SMA actuator of FIG. 9A shown during mechanical attachment and integration into a structural spar;

FIG. 9C is an illustration of a side view of the composite structure and the trained SMA actuator of FIG. 9A shown after mechanical attachment and integration and integrated into a structural spar;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 6:
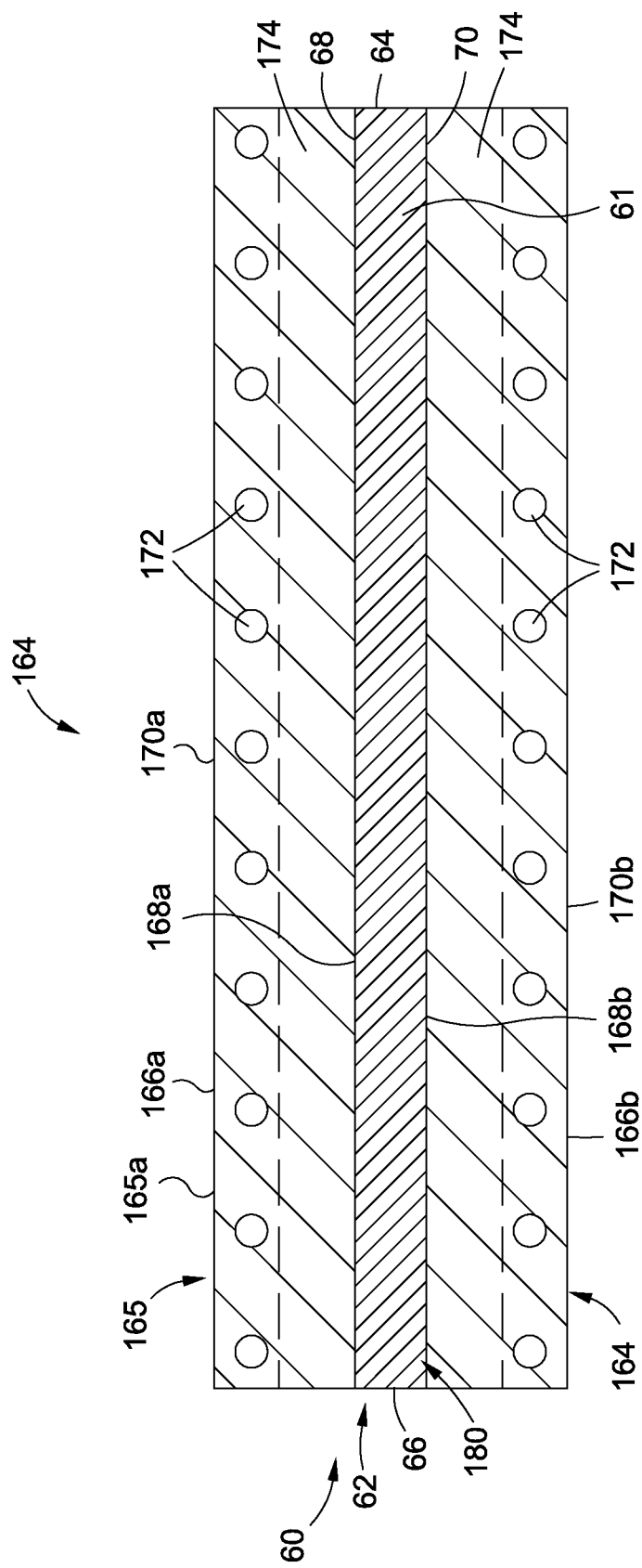
FIG. 6 is an illustration of an enlarged plan view of an embodiment of an SMA actuator bonded to a composite structure prior to installation in a training apparatus assembly of the disclosure.
Figure 8C:
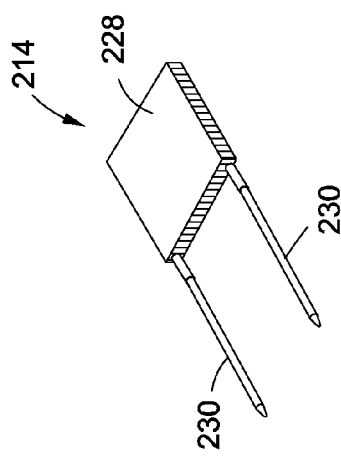
FIG. 8C is an illustration of an enlarged perspective view of the dotted circle 8C of FIG. 8A showing a thermoelectric module (TEM)
Figure 8D:
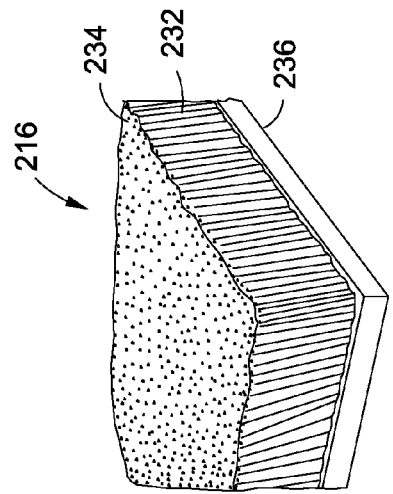
FIG. 8D is an illustration of an enlarged perspective partial view of the dotted circle 8D of FIG. 8A showing a thermal connector.
Figure 8A:
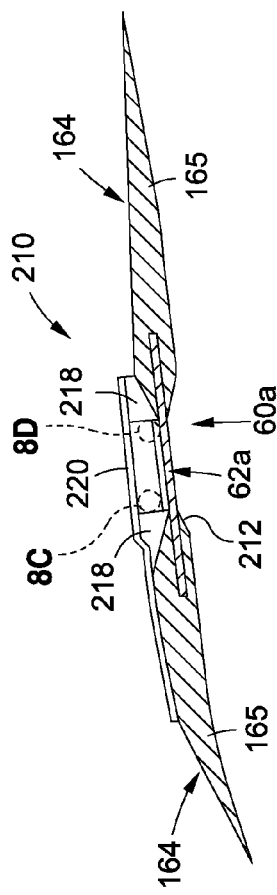
FIG. 8A is an illustration of an enlarged perspective side view of a shape memory alloy (SMA) actuator assembly with an embodiment of a trained SMA actuator trained by one of the embodiments of a method of the disclosure.
Figure 8B:
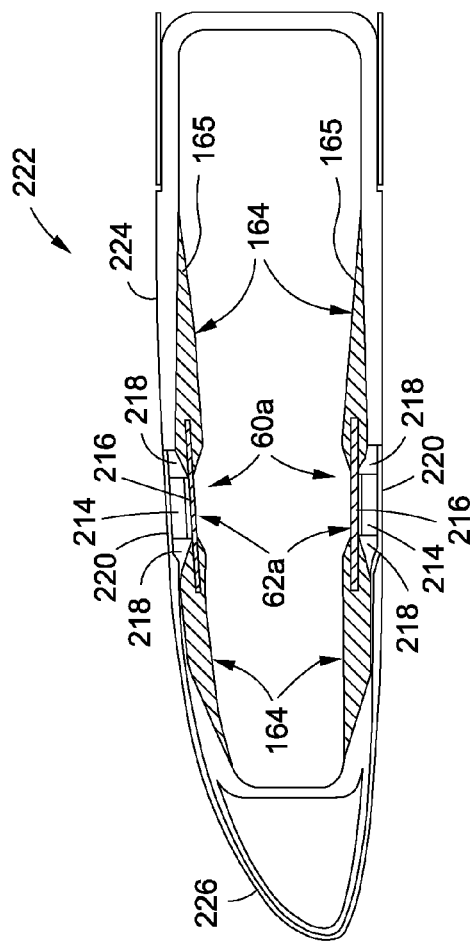
FIG. 8B is an illustration of an enlarged perspective side view of the SMA actuator assembly of FIG. 8A integrated into a structural spar.

Now referring to the Figures, in the embodiments as disclosed herein, there is provided a method 300 (see FIG. 12) of training a "shape memory alloy" ("SMA") workpiece 60 (see FIG. 3A), such as in the form of a shape memory alloy (SMA) actuator 62 (see FIG. 3B), to obtain a trained shape memory alloy (SMA) workpiece 60a (see FIG. 3B), such as in the form of a trained SMA actuator 62a (see FIG. 3B), for joining to a structure 164 (see FIGS. 6, 8B, 9C), such as a composite structure 165 (see FIGS. 6, 8B, 9C). The trained SMA actuator 62a may be joined to or incorporated in various structures 164 of mechanical, structural, thermo-mechanical, thermo-structural, electro-thermo-mechanical, and electro-thermo-structural systems.

Figure 1:
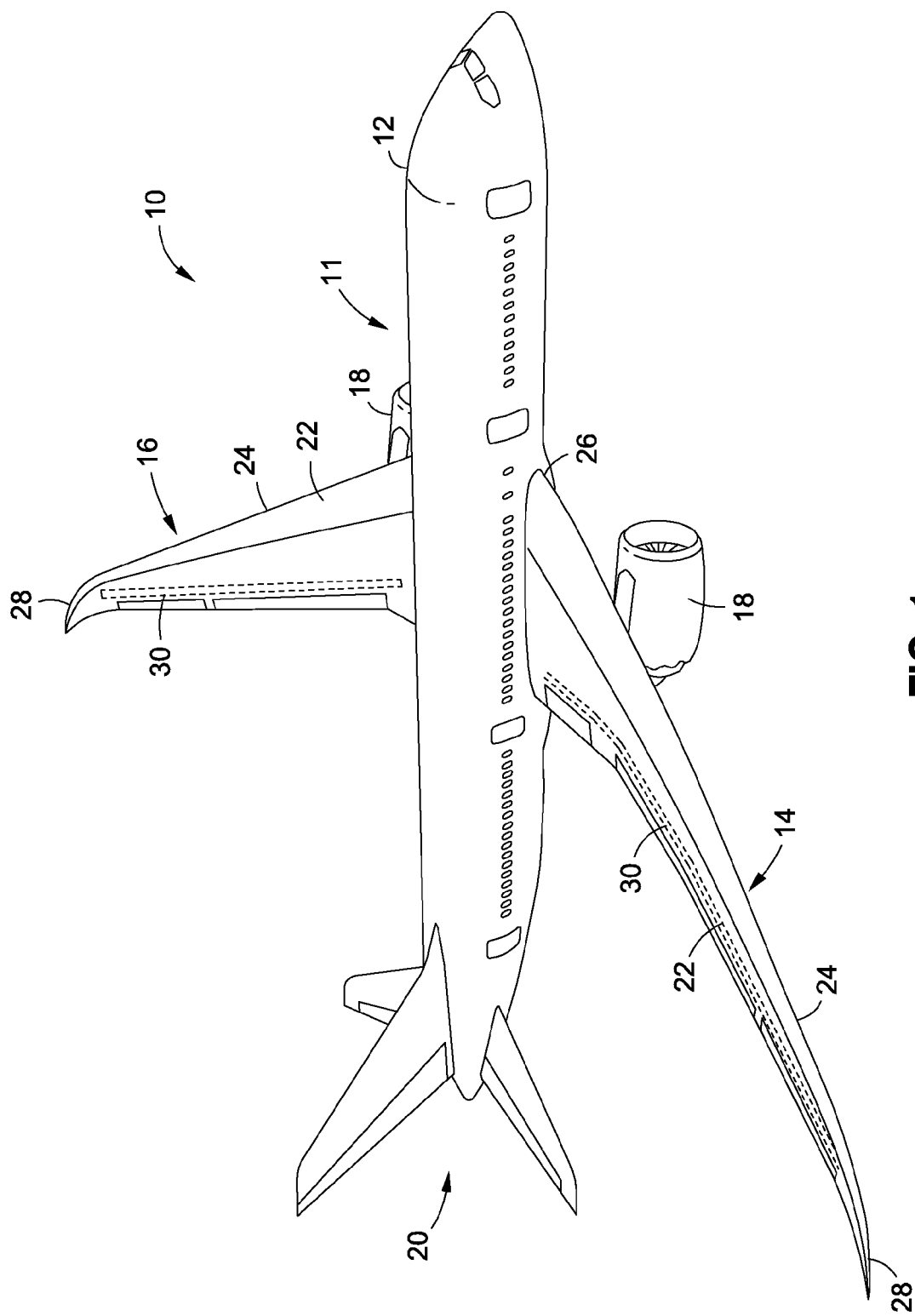
FIG. 1 is an illustration of a perspective view of a known aircraft that may incorporate an embodiment of a trained shape memory alloy (SMA) actuator trained by one of the embodiments of a method of the disclosure.

FIG. 1 is an illustration of a perspective view of an air vehicle 10, such as an aircraft 11, that may incorporate an embodiment of the trained SMA actuator 62a (see FIG. 3B) of the disclosure. As shown in FIG. 1, the aircraft 11 includes a fuselage 12, wings 14, 16 attached to the fuselage 12, one or more propulsion units 18, and an empennage 20. Each wing 14, 16 has an upper wing skin 22, a lower wing skin 24, a wing root 26, a wing tip 28, and at least one structural spar 30 between the upper wing skin 22 and the lower wing skin 24. As used herein, "structural spar" means an elongated structural member having the ability to carry one or more loads.

Figure 2:
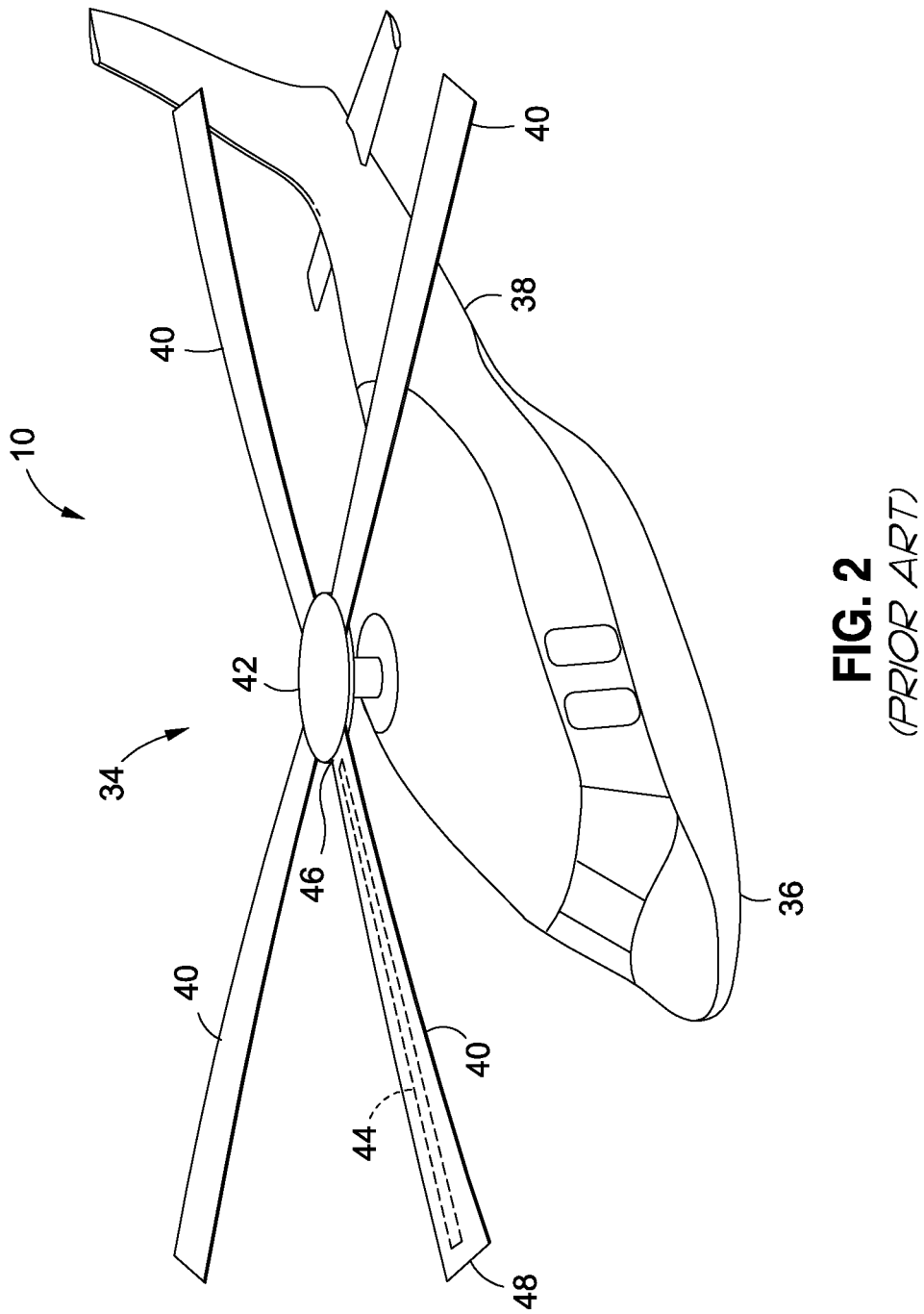
FIG. 2 is an illustration of a perspective view of a known rotorcraft that may incorporate an embodiment of a trained SMA actuator trained by one of the embodiments of a method of the disclosure.
Figures 3A, 3B:
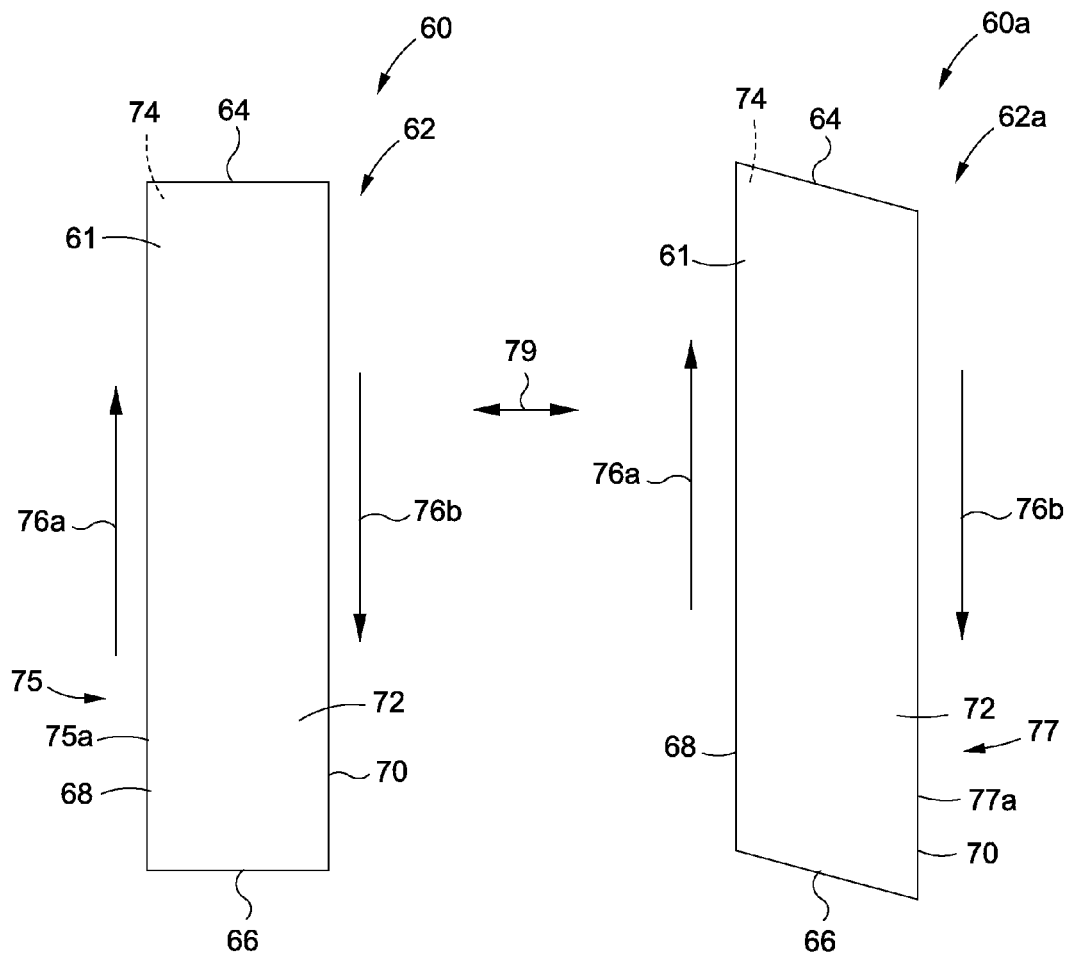
FIG. 3A is an illustration of an enlarged perspective plan view of an embodiment of an SMA workpiece of the disclosure.
FIG. 3B is an illustration of an enlarged perspective plan view of an embodiment of a trained SMA workpiece of the disclosure.

FIG. 2 is an illustration of a perspective view of an air vehicle 10, such as a rotorcraft 34, in the form of a helicopter, that may incorporate an embodiment of the trained SMA actuator 62a (see FIG. 3B). As shown in FIG. 2, the rotorcraft 34 includes a fuselage 36, a tail boom 38, and a plurality of rotor blades 40 coupled to a hub 42. Each rotor blade 40 includes at least one structural spar 44 extending from a blade root 46 to a blade tip 48.

Although the aircraft 11 (see FIG. 1) and the rotorcraft 34 (see FIG. 2) are generally representative of air vehicles 10 that may incorporate one or more embodiments of the trained SMA actuator 62a (see FIG. 3B), the teachings of the disclosed embodiments may be applied to other air vehicles and other types of vehicles, as well as other structures suitable for joining to or incorporating an embodiment of the trained SMA actuator 62a (see FIG. 3B) of the disclosure.

Figure 11:
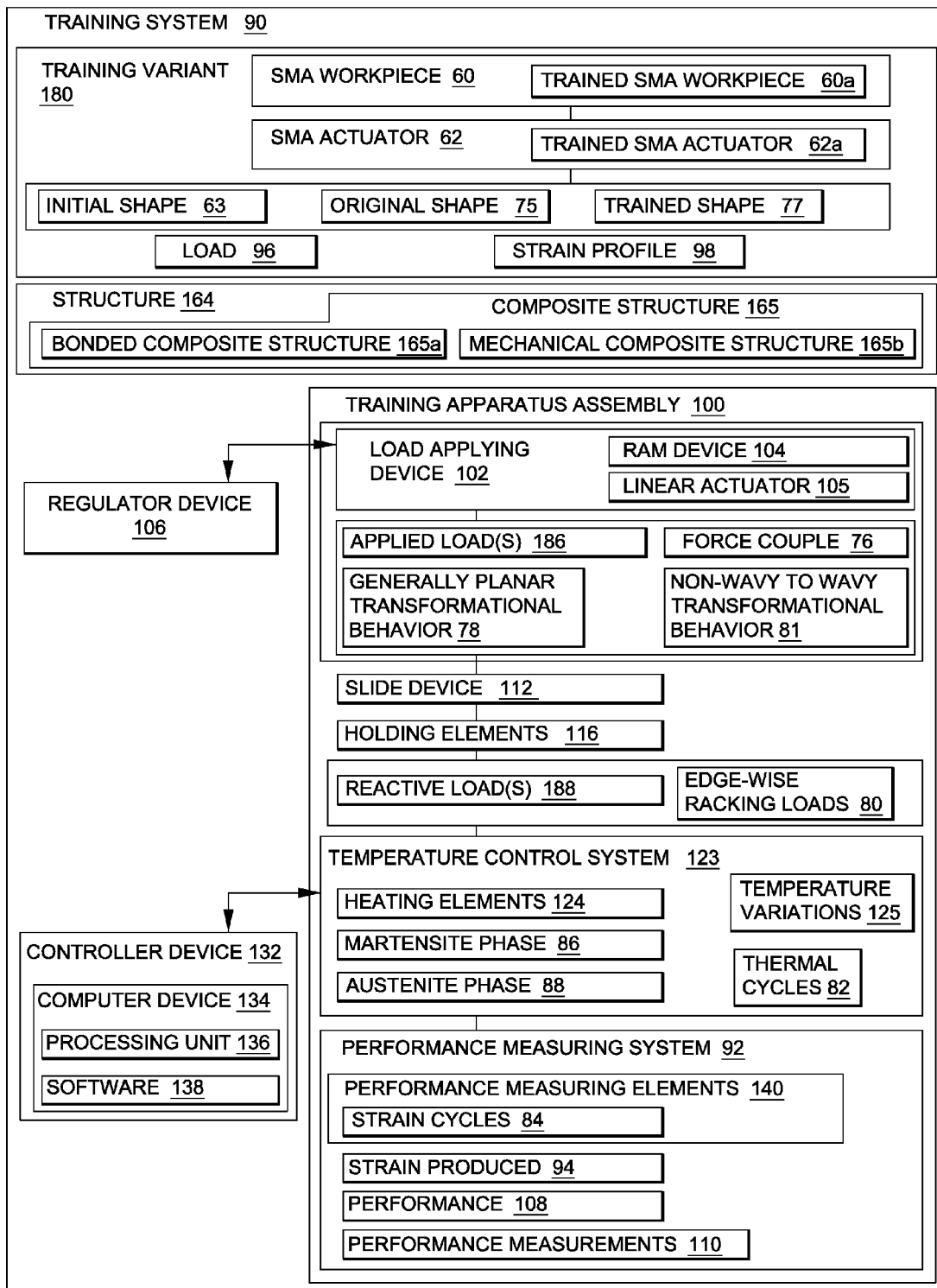
FIG. 11 is a block diagram of a training system that may be used in one of the embodiments of a method of the disclosure; and, FIG. 12 is a box flow diagram of one of the embodiments disclosed herein of a method of training an SMA workpiece.
Figure 12:
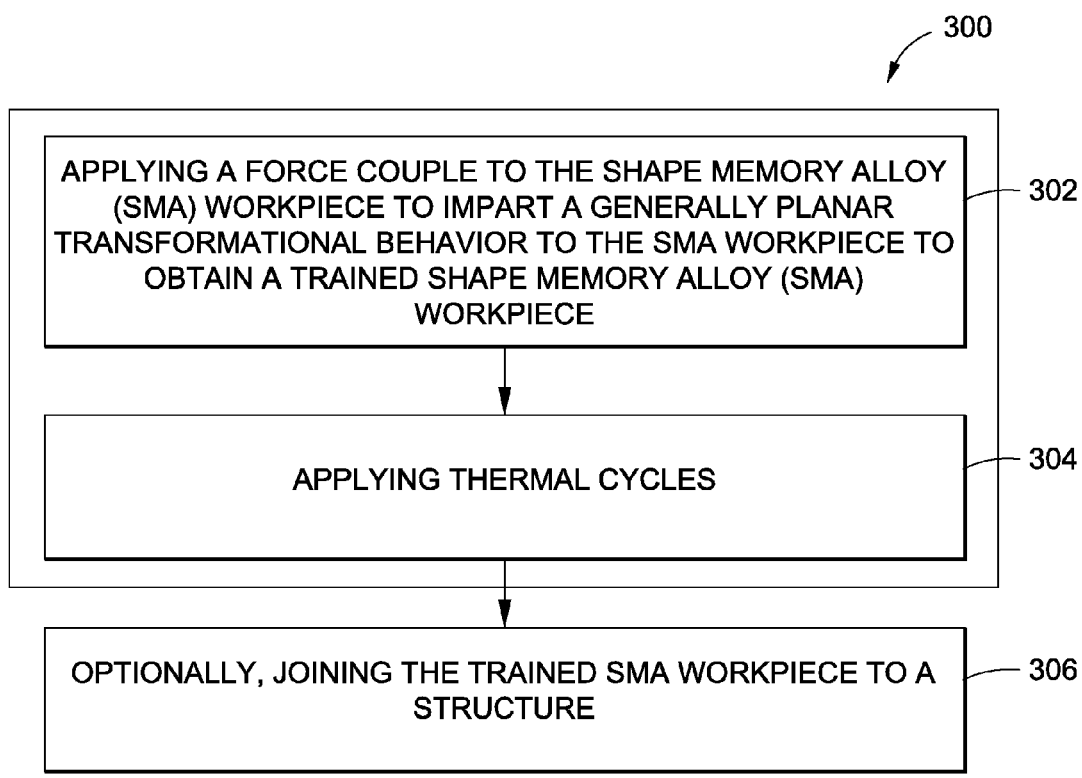

In one embodiment of the disclosure, there is provided a method 300 (see FIG. 12) of training a shape memory alloy (SMA) workpiece 60 (see FIG. 3A). FIG. 12 is a box flow diagram of one of the embodiments disclosed herein of the method 300 of training the SMA workpiece 60 (see FIG. 3A). As shown in FIG. 12, the method 300 comprises step 302 of applying a force couple 76 (see FIG. 11) to the SMA workpiece 60 (see FIG. 3A) to impart a generally planar transformational behavior 78 (see FIG. 11) to the SMA workpiece 60 to obtain a trained shape memory alloy (SMA) workpiece 60a (see FIG. 3B).

As used herein, a "force couple" means a pair of opposing forces, such as, for example, a first opposing force 76a (see FIG. 3A) and a second opposing force 76b (see FIG. 3A), or an applied force 244 (see FIG. 10) and reactive force 246 (see FIG. 10), where the opposing forces are substantially equal in magnitude, substantially oppositely directed, substantially non-collinear, generally coplanar, and displaced by a substantially perpendicular distance. As used herein, "generally planar transformational behavior" means an in-plane motion that transforms or changes a shape of a shape memory alloy (SMA) structure, such as the SMA workpiece 60, when a force couple is applied to the SMA structure, such as the SMA workpiece 60.

FIG. 3A is an illustration of an enlarged perspective plan view of an embodiment of an SMA workpiece 60 of the disclosure. FIG. 3B is an illustration of an enlarged perspective plan view of an embodiment of a trained SMA workpiece 60a of the disclosure. In one embodiment of the disclosure, there is provided the trained shape memory alloy (SMA) workpiece 60a (see FIG. 3B). The trained SMA workpiece 60a comprises an SMA workpiece 60 (see FIG. 3A). The SMA workpiece 60 is made of a shape memory alloy raw material 61 (see FIG. 3A). Preferably, the SMA workpiece 60 is in the form of a shape memory alloy (SMA) actuator 62 (see FIG. 3A) having the configuration or shape of a sheet or strip, and more preferably, having a planar shape such as a rectangle shape 75a (see FIG. 3A). As shown in FIG. 3A, the shape of the SMA workpiece 60 is in an original shape 75 (see FIG. 3B) such as in the form of the rectangle shape 75a (see FIG. 3B). As shown in FIG. 3A, the SMA workpiece 60 comprises a first end 64, a second end 66, a first edge 68, a second edge 70, a first surface 72, such as a top surface, and a second surface 74. such as a bottom surface. As further shown in FIGS. 3A-3B, the first opposing force 76a (see FIG. 3A) is applied to the first edge 68 (see FIG. 3A) of the SMA workpiece 60, and the second opposing force 76b (see FIG. 3A) is applied to the second edge 70 (see FIG. 3A) of the SMA workpiece 60, to impart the generally planar transformational behavior 78 (see FIG. 11) to the SMA workpiece 60. The generally planar transformational behavior 78 (see FIG. 11) may be imparted to the SMA workpiece 60 by producing a racking motion 79 indicated by the arrow between FIGS. 3A and 3B to change a shape of the SMA workpiece 60 to obtain the trained SMA workpiece 60a (see FIG. 3B). The shape of the trained SMA workpiece 60a is a trained shape 77 (see FIG. 3B), such as in the form of a parallelogram shape 77a (see FIG. 3B). The trained SMA workpiece 60a, such as in the form of trained SMA actuator 62a, comprises the first end 64, the second end 66, the first edge 68, the second edge 70, the first surface 72, such as a top surface, and the second surface 74, such as a bottom surface.

The step 302 (see FIG. 12) of method 300 (see FIG. 12) of applying the force couple 76 (see FIG. 11) to the SMA workpiece 60 (see FIG. 3A) may comprise applying opposing forces, such as applying the first opposing force 76a (see FIG. 3A) to the first edge 68 (see FIG. 3A) and applying the second opposing force 76b (see FIG. 3A) to the second edge 70 (see FIG. 3A), such that edge-wise racking loads 80 (see FIG. 11) are applied to the SMA workpiece 60. As used herein, "edge-wise racking loads" means loads of a nature that tend to transform a substantially rectangle shape 75a (see FIG. 3A) object or structure to a substantially parallelogram shape 77a (see FIG. 3B) object or structure, or to transform a substantially square shape (not shown) object or structure to a substantially rhombus shape (not shown) object or structure.

In addition, the step 302 of applying the force couple 76 (see FIG. 11) to the SMA workpiece 60 (see FIG. 3A) may comprise applying opposing forces, such as applied force 244 (see FIG. 10) and reactive force 246 (see FIG. 10), such that a wave-like deformation 242 (see FIG. 10) is produced in the SMA workpiece 60, discussed in further detail below with respect to FIG. 10. In addition, the step 302 of applying the force couple 76 (see FIG. 11) to the SMA workpiece 60 (see FIG. 3A) may comprise applying opposing forces, such as applied force 244 (see FIG. 10) and reactive force 246 (see FIG. 10), to impart a generally non-wavy to wavy transformational behavior 247 (see FIG. 11) to the SMA workpiece 60, that is, changing the shape of the SMA workpiece 60, such as in the form of SMA actuator 62, from an original shape 75 (see FIG. 3A) or non-wavy shape to a wavy shape 243 (see FIG. 10).

As further shown in FIG. 12, the method 300 may comprise step 304 of applying thermal cycles 82 (see FIG. 11) to the SMA workpiece 60, such as in the form of SMA actuator 62. The step 304 of applying the thermal cycles 82 may comprise applying the force couple 76 in a cyclic manner, thereby imparting substantially planar strain cycles 84 (see FIG. 11) to the SMA workpiece 60 (see FIG. 3A), such as in the form of SMA actuator 62, to cause the SMA workpiece 60 to have the generally planar transformational behavior 78 (see FIG. 11). The step 304 of applying the thermal cycles 82 may comprise applying heat to the SMA workpiece 60, such as in the form of SMA actuator 62, to produce the racking motion 79 (see FIGS. 3A-3B) that changes a shape of the SMA workpiece 60 from the original shape 75 (see FIG. 3A) comprising the substantially rectangle shape 75a (see FIG. 3A), to the trained shape 77 (see FIG. 3B) comprising the substantially parallelogram shape 77a (see FIG. 3B). The racking motion 79 that changes the shape of the SMA workpiece 60 from the substantially rectangle shape 75a to the substantially parallelogram shape 77a preferably preserves one base and a corresponding height of the SMA workpiece 60.

The step 304 of applying the thermal cycles 82 may comprise thermo-mechanical processing of the SMA workpiece 60, such as in the form of SMA actuator 62, to impart the generally planar transformational behavior 78 (see FIG. 11) to the SMA workpiece 60 to obtain the trained SMA workpiece 60a (see FIG. 3B), such as in the form of trained SMA actuator 62a. The thermo-mechanical processing may comprise application of temperature variations 125 (see FIG. 11) using a temperature control system 123 (see FIG. 5), as discussed in further detail below.

The shape memory alloy (SMA) raw material 61 (see FIGS. 3A-3B) may include, but is not limited to, such suitable shape memory alloys as nickel-titanium (NiTinol) based alloys, nickel-titanium-platinum based alloys, indium-titanium based alloys, nickel-aluminum based alloys, nickel-aluminum-platinum based alloys, nickel-gallium based alloys, copper based alloys, gold-cadmium based alloys, iron-platinum based alloys, iron-palladium based alloys, silver-cadmium based alloys, indium-cadmium based alloys, manganese-copper based alloys, ruthenium-niobium based alloys, ruthenium-tantalum based alloys, titanium based alloys, iron based alloys, and the like. More preferably, the shape memory alloy is NiTinol.

Preferably, the shape memory alloys used in embodiments of the SMA workpiece 60 (see FIG. 3A), such as in the form of SMA actuator 62 (see FIG. 3B), disclosed herein may have a two-way shape effect. The two-way shape effect, which the shape memory alloys undergo, comprises two phases or conditions, including a martensite phase 86 (see FIG. 11) and an austenite phase 88 (see FIG. 11). The martensite phase 86 is a relatively soft and easily deformed phase of shape memory alloys which exists at lower temperatures. When the shape memory alloy is heated, it goes through transformation from the martensite phase 86 (original shape 75) to the austenite phase 88 (trained shape 77). In the austenite phase 88, the shape memory alloy "remembers" the shape it had before it was deformed. At a low stress and a low temperature, the martensite phase 86 exists, and at a higher temperature and a higher stress, the austenite phase 88 exists. The shape memory alloys may undergo large amounts of strain and then, upon temperature increase or unloading, revert to their original shape 75.

Upon heating the SMA workpiece 60 (see FIG. 3A) such as in the form of SMA actuator 62, and upon application of the force couple 76 (see FIG. 11), such as in the form of first opposing force 76a and second opposing force 76b, to the SMA workpiece 60, the two-way shape effect allows the SMA workpiece 60 to be trained and to move from the original shape 75 (see FIG. 3A), or the martensite phase 86 (see FIG. 11), to the trained shape 77 (see FIG. 3B), or the austenite phase 88 (see FIG. 11), and to move back from the trained shape 77 to the original shape 75. The force couple 76 may be applied in a cyclic manner by applying a predetermined stress level (e.g., 25-35 ksi, and preferably 30 ksi (ksi=one thousand pounds per square inch)), and repeatedly heating the SMA workpiece 60 for at least 500-1000 cycles, thereby imparting substantially planar strain cycles 84 (see FIG. 11) to the SMA workpiece 60 (see FIG. 3A), such as in the form of SMA actuator 62 (see FIG. 3A). The SMA workpiece 60 facilitates shape change when heated from a first temperature, corresponding to the martensite phase 86 or original shape 75, to a second temperature, corresponding to the austenite phase 88 or trained shape 77. When the SMA workpiece 60 is heated to the second temperature, or above a transition temperature, the SMA workpiece 60 reaches the austenite phase 88 (see FIG. 11) causing the SMA workpiece 60 to move and to resume its original shape 75. The training comprising thermo-mechanical processing or cycling may be performed in a manner that holds the first edge 68 (see FIG. 3A) of the SMA workpiece 60 stationary while the second edge 70 (see FIG. 3A) moves or receives a training load Thus, training the SMA workpiece 60 may further comprise cyclically applying and removing a load and increasing and decreasing a temperature of the SMA workpiece 60 while measuring and controlling strain.

Prior to any training being performed on the SMA workpiece 60, such as in the form of SMA actuator 62, the SMA workpiece 60 may have an initial shape 63 (see FIG. 11) of a rectangular, undeformed shape. During training of the SMA workpiece 60, such as in the form of SMA actuator 62, applied loads 186 (see FIG. 11) are preferably applied to the SMA workpiece 60 while thermal cycling the SMA workpiece 60 with thermal cycles 82 (see FIG. 11). In the martensite phase 86 (see FIG. 11), the SMA workpiece 60 has the original shape 75, which is preferably a deformed shape due to applied loads 186 (see FIG. 11) being applied to the SMA workpiece 60 during training. When the SMA workpiece 60 is loaded while cold in the martensite phase 86, the SMA workpiece deforms from the substantially rectangle shape 75a (see FIG. 3A) to the substantially parallelogram shape 77a (see FIG. 3B) (deformed shape). When heat is applied, the substantially parallelogram shape 77a (deformed shape) returns to a shape near the initial shape 63, e.g., the rectangular, undeformed shape. By thermal cycling for an effective period of time, the SMA workpiece 60 preferably becomes trained in the form of trained SMA workpiece 60a (see FIG. 3B). Once trained, the trained SMA workpiece 60a, such as having the substantially parallelogram shape 77a, may be processed such that the first edge 68 (see FIG. 3B), the second edge 70 (see FIG. 3B), the first end 64 (see FIG. 3B) and/or the second end 66 (see FIG. 3B) may be cut into the original shape 75 (see FIG. 3A), for example, a rectangle shape 75a (see FIG. 3A). When heated, the original shape 75 of the SMA workpiece 60 (see FIG. 60) preferably transforms to the trained shape 77 (austenite phase 88) of the trained SMA workpiece 60a (see FIG. 3B).

In another embodiment of the disclosure, there is provided a training system 90 (see FIG. 11) capable of performing work. FIG. 11 is a block diagram of the training system 90 that may be used in one of the embodiments of the method 300 (see FIG. 12) of the disclosure. As shown in FIG. 11, the training system 90 comprises a shape memory alloy (SMA) workpiece 60, such as a shape memory alloy (SMA) actuator 62, that exhibits a generally planar transformational behavior 78. The training system 90 further comprises one or more heating elements 124 (see FIGS. 5, 11) for transforming the SMA workpiece 60, such as in the form of SMA actuator 62, from the original shape 75 (see FIG. 3A) to the trained shape 77 (see FIG. 3B), thereby performing work.

The trained SMA actuator 62a (see FIG. 3B) may comprise the trained SMA workpiece 60a (see FIG. 3B) exhibiting the generally planar transformational behavior 78 (see FIG. 11). The trained SMA actuator 62a may further comprise the trained SMA workpiece 60a (see FIG. 3B), where the trained SMA workpiece 60a is trained by applying a force couple 76 (see FIG. 11) to the SMA workpiece 60 (see FIG. 3A) to impart the generally planar transformational behavior 78 (see FIG. 11) to the SMA workpiece 60. The training system 90 is preferably capable of imparting motion and thereby performing work. As shown in FIG. 11, the training system 90 further comprises a training apparatus assembly 100 (see also FIG. 4) having a load applying device 102 (see also FIG. 4) and a temperature control system 123 (see also FIG. 5). The load applying device 102 is capable of imparting motion or transmitting motion to a structure comprising a mechanism or linkage intended to move and receive motion, such as a slide device 112 (see FIGS. 4, 11).

Figure 4:
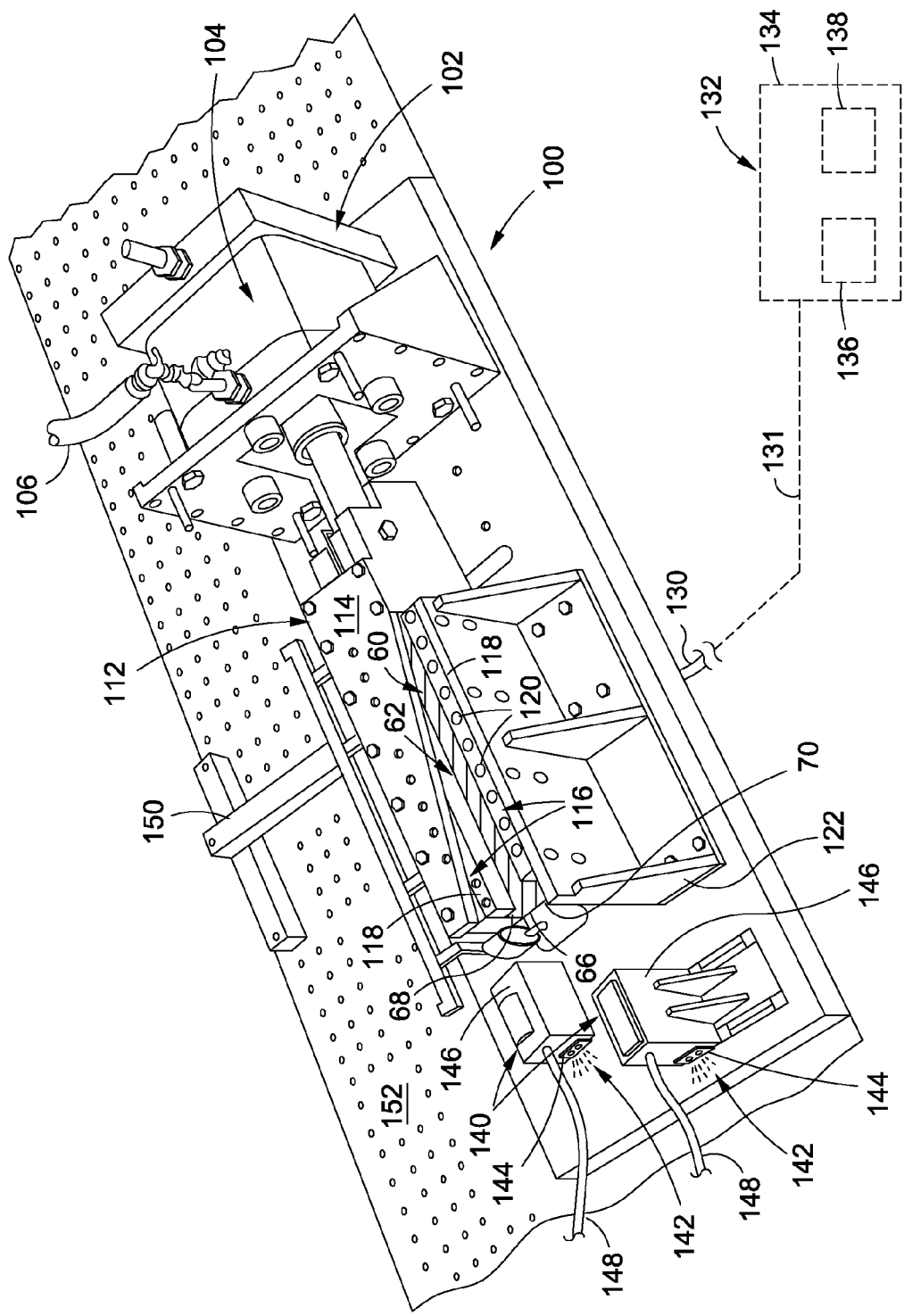
FIG. 4 is an illustration of a perspective view of a training apparatus assembly that may be used in one of the embodiments of a method of the disclosure.

The load applying device 102 (see FIG. 4) preferably applies the edge-wise racking loads 80 (see FIG. 11) to the SMA workpiece 60, such as in the form of SMA actuator 62 (see FIG. 4). The temperature control system 123 (see FIG. 5) preferably controls the one or more heating elements 124 (see FIG. 5) and preferably applies temperature variations 125 (see FIG. 11) to the SMA workpiece 60, such as in the form of SMA actuator 62, in order to produce the racking motion 79 (see FIGS. 3A-3B) that changes a shape of the SMA workpiece 60, such as in the form of SMA actuator 62, from the original shape 75 (see FIG. 3A) comprising the substantially rectangle shape 75a (see FIG. 3A) to the trained shape 77 (see FIG. 3B) comprising the substantially parallelogram shape 77a (see FIG. 3B).

The training and thermo-mechanical processing of the SMA workpiece 60, such as in the form of the SMA actuator 62, preferably comprises using the training system 90 (see FIG. 11) with the training apparatus assembly 100 (see FIGS. 4, 11), and preferably further includes a performance measuring system 92 (see FIG. 11) for directly or indirectly determining a strain produced 94 (see FIG. 11) or a load 96 (see FIG. 11) applied by the training apparatus assembly 100 or generated by the SMA workpiece 60. Interface openings 158 (see FIG. 5) may be cut into the SMA workpiece 60 (see FIG. 5) if the SMA workpiece 60 is to be installed into the training apparatus assembly 100 (see FIG. 4). Such interface openings 158 may be cut in a desired shape and size in order to receive holding elements 116 (see FIG. 4), such as clamps 118 (see FIG. 4), of the training apparatus assembly 100 (see FIG. 4).

The SMA workpiece 60, such as in the form of SMA actuator 62, may be cut, chemically processed, and joined, such as via bonding, mechanical attachment, or another suitable joining process, to a structure 164 (see FIG. 6), preferably a composite structure 165 (see FIG. 6). The structure 164 may be machined as necessary for clamping into the training apparatus assembly 100 (see FIG. 4).

FIG. 4 is an illustration of a perspective view of the training apparatus assembly 100 that may be used to train the SMA workpiece 60, such as in the form of SMA actuator 62. Training the SMA workpiece 60, such as in the form of SMA actuator 62, may comprise mounting the SMA workpiece 60, such as in the form of the SMA actuator 62 (see FIG. 4), into the training apparatus assembly 100 and applying the edge-wise racking loads 80 while heating and cooling the SMA workpiece 60, such as in the form of SMA actuator 62. The SMA workpiece 60 (see FIG. 4), such as in the form of SMA actuator 62 (see FIG. 4), is preferably clamped along the first edge 68 (see FIG. 4) and along the second edge 70 (see FIG. 4). The second edge 70 (see FIG. 3A) is preferably fixed and the first edge 68 (see FIG. 3A) is preferably free to move linearly along a linear slide device 114 (see FIG. 4). The edge-wise racking loads 80 (see FIG. 11) may be uniformly distributed, discretely distributed, or distributed in a varying manner.

As shown in FIG. 4, the training apparatus assembly 100 may be positioned on and coupled to a substantially flat surface 152 via a base coupling structure 150. The training apparatus assembly 100 comprises the load applying device 102 (see FIG. 4). The load applying device 102 may comprise a ram device 104 (see FIG. 4) or a linear actuator (see FIG. 11). The load applying device 102 may be coupled to a regulator device 106 for regulating the load applying device 102. The regulator device 106 may be in the form or a pressure regulator, a fluid powered regulator, an electric powered regulator, or another suitable regulator device.

As shown in FIG. 4, the training apparatus assembly 100 may further comprise the slide device 112, such as in the form of linear slide device 114. The linear slide device 114 is preferably coupled to the load applying device 102. One or more applied loads 186 (see FIG. 11) may be applied to the linear slide device 114 by the load applying device 102 (see FIG. 4).

During training, the SMA workpiece 60 (see FIG. 4), such as in the form of SMA actuator 62 (see FIG. 4), is preferably mounted into the training apparatus assembly 100 with the second end 66 (see FIG. 4) furthest from the load applying device 102. As shown in FIG. 4, the training apparatus assembly 100 may further comprise two or more holding elements 116, such as in the form of clamps 118. The two or more holding elements 116, such as in the form of clamps 118, may include holes 120 (see FIG. 4) for receiving fasteners, such as bolts (not shown), in order to hold the SMA workpiece 60, such as in the form of SMA actuator 62, in the training apparatus assembly 100. The holding elements 116 may be secured to the training apparatus assembly 100 via a support structure 122. The SMA workpiece 60, such as in the form of SMA actuator 62, is preferably held on the first edge 68 and the second edge 70 by the holding elements 116 (see FIG. 4), such as in the form of clamps 118 (see FIG. 4). As shown in FIG. 4, the SMA workpiece 60, such as in the form of SMA actuator 62, may be clamped on the first edge 68 and the second edge 70, with the second edge 70 fixed and the first edge 68 free to move linearly along the slide device 112. The holding elements 116 may react to one or more reactive loads 188 (see FIG. 11) from the linear slide device 114, as a result of the one or more applied loads 186 applied to the linear slide device 114 from the load applying device 102, i.e. the holding elements 116 may react or impart the edge-wise racking loads 80 (see FIG. 11).

Figure 5:
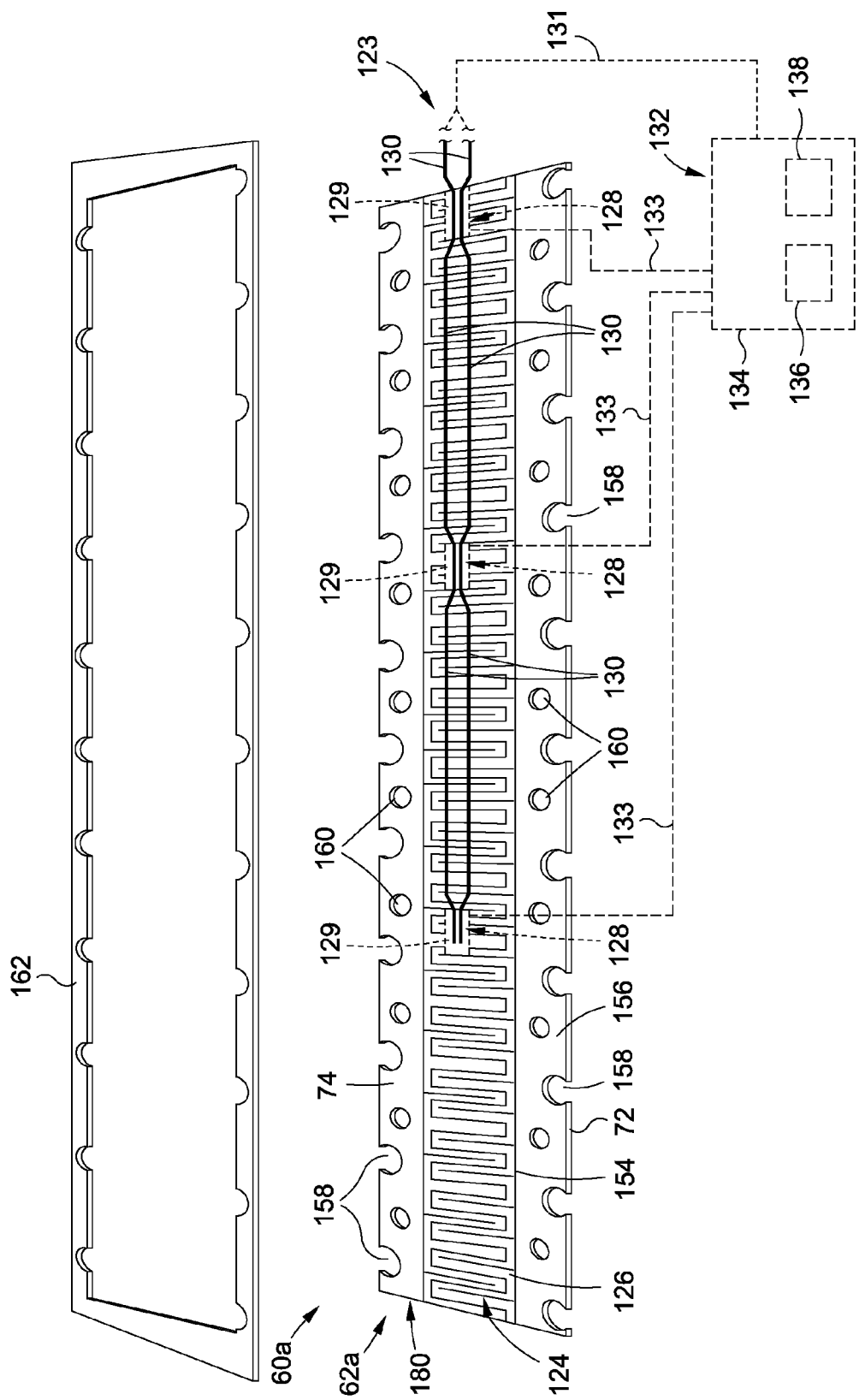
FIG. 5 is an illustration of an enlarged perspective plan view of an embodiment of a trained SMA actuator and a temperature control system of the disclosure.

The training apparatus assembly 100 may further comprise the temperature control system 123 (see FIGS. 5, 11). FIG. 5 is an illustration of an enlarged perspective plan view of an embodiment of the trained SMA workpiece 60a, for example, the trained SMA actuator 62a, that may be trained by one of the embodiments of the method 300 (see FIG. 12) of the disclosure and showing the temperature control system 123. As shown in FIG. 5, the temperature control system 123 may comprise one or more heating elements 124 positioned on the second surface 74 of the SMA workpiece, such as in the form of SMA actuator 62. The one or more heating elements 124 may comprise one or more of flexible heating tape 126 (see FIGS. 5, 11), TEMs (thermoelectric modules) 214 (see FIG. 8C), heat lamps (not shown), heat guns (not shown), an electrical current (not shown) passed though the resistive shape memory alloy material, or another suitable heating element for generating or controlling heat.

As shown in FIG. 5, the one or more heating elements 124 are preferably positioned adjacent the trained SMA workpiece 60a, such as in the form of trained SMA actuator 62a, to facilitate heating the shape memory alloy to move from the martensite phase 86 (see FIG. 11) to the austenite phase 88 (see FIG. 11) where the SMA actuator 62 moves in a shear direction. During training and when heated, the SMA workpiece 60 (see FIG. 3A), such as in the form of SMA actuator 62 (see FIG. 3B), attempts to transform from the original shape 75 (see FIG. 3A) (deformed shape due to training loads, martensite phase 86 (see FIG. 11)), to the trained shape 77 (see FIG. 3B) (near initial shape 63 (see FIG. 11), undeformed shape, austenite phase 88 (see FIG. 11)), and to move back from the trained shape 77 to the original shape 75. When the temperature of the trained SMA workpiece 60a, such as in the form of trained SMA actuator 62a cools, the shape memory alloy material returns back to the original shape 75, martensite phase 86 (see FIG. 11). When the SMA workpiece 60 is being trained, the applied force during training may always be present and substantially constant in magnitude.

As further shown in FIG. 5, the temperature control system 123 may comprise one or more temperature sensors 128 positioned on the first surface 72 of the trained SMA actuator 62a opposite the one or more heating elements 124 on the second surface 74 of the trained SMA actuator 62a. The temperature sensor 128 may comprise a thermocouple device 129 (see FIG. 5), or another suitable temperature sensor 128. FIG. 5 shows the one or more heating elements 124 connected to heat element wires 130 and further shows the temperature sensors 128 each connected to a separate sensor wire 133. As shown in FIG. 5, the heating elements 124 are preferably positioned on the second surface 74 of the trained SMA workpiece 60a in an active actuator area 154. As further shown in FIG. 5, the fastener openings 158 and interface openings 160 are preferably positioned on an outer interface area 156 of the trained SMA workpiece 60a.

As shown in FIG. 4 and FIG. 5, the temperature control system 123 may further comprise a controller device 132 coupled to the heat element wires 130 of the heating elements 124 of the training apparatus assembly 100 via a connector 131 and further coupled to the sensor wires 133 of the temperature sensors 128. As further shown in FIG. 4 and FIG. 5, the controller device 132 may comprise a computer device 134 that may include a processing unit 136 for running and processing software 138.

The temperature of the SMA workpiece 60, such as in the form of SMA actuator 62, is preferably controlled using the heating elements 124, the temperature sensors 128, and the controller device 132. The training apparatus assembly 100 may further comprise the performance measuring system 92 comprising performance measuring elements 140 (see FIGS. 4, 11). The performance measuring elements 140 may comprise one or more sensors 142 (see FIG. 4), such as in the form of laser position sensors 144 (see FIG. 4). FIG. 4 shows two sets of laser position sensors 144 attached to respective housing elements 146. The performance measuring elements 140, such as in the form of laser position sensors 144, preferably measure the motion of the first edge 68 and the motion of the second edge 70 of the SMA workpiece 60, such as in the form of SMA actuator 62. The strain produced 94 (see FIG. 11) by the motion may be measured by the performance measuring elements 140 (see FIG. 4). When training is complete, the trained SMA workpiece 60a (see FIG. 3B) may be activated by heating and cooling, and a performance 108 (see FIG. 11) of the trained SMA workpiece 60a may be measured using the performance measuring elements 140. Training may causes permanent deformation, resulting in a generally slight shape change of the trained SMA workpiece 60a relative to an initial shape 63 (see FIG. 11) of the SMA workpiece 60. The training apparatus assembly 100 preferably applies applied loads 186 (see FIG. 11) to the SMA workpiece 60 while heating and cooling the SMA workpiece 60.

After training and heating, the trained SMA workpiece 60a, such as in the form of trained SMA actuator 62a, may undergo further processing. For example, if the shape of the trained SMA workpiece 60a following training is not of a desired shape due to deformation or permanent deformation that may occur during training, the trained SMA workpiece 60a may undergo one or more further processing techniques. Such processing techniques may include one or more of machining, chemical processing, cutting, surface treating, surface finishing, bonding, coating, plating, polishing, or another suitable processing technique.

After processing, the trained SMA workpiece 60a (see FIG. 3B), such as in the form of trained SMA actuator 62a (see FIG. 3B), may be joined to one or more structures 164 (see FIGS. 6, 8A, 9B). As shown in FIG. 12, the method 300 may further comprise step 306 of optionally joining the trained SMA workpiece 60a (see FIG. 3B), such as in the form of trained SMA actuator 62a (see FIG. 3B), to one or more structures 164. Preferably, the one or more structures 164 are capable of changing shape in response to a change in temperature of the trained SMA workpiece 60a, such as the trained SMA actuator 62a. The step 306 of joining the trained SMA workpiece 60a, such as the trained SMA actuator 62a, may comprise integrating or embedding the trained SMA workpiece 60a, such as the trained SMA actuator 62a in a structural spar 30 (see FIG. 1) or structural spar 44 (see FIG. 2) of an air vehicle 10 (see FIG. 1, FIG. 2) to influence a shape of the structural spar 30 or structural spar 44. As used herein, "influence" means and includes, but is not limited to, warp, deflect, twist, bend, distort or adapt a shape of a structure, for example, a structural spar 30 (see FIG. 1) or portion of a structural spar 30, a structural spar 44 (see FIG. 2) or portion of a structural spar 44, or a structural spar 224 (see FIG. 8B) or portion of a structural spar 224. The embedded trained SMA actuator 62a is also shown integrated into structural spar 224 (see FIGS. 8B, 9C).

In another embodiment of the disclosure, there is provided a structure 164 (see FIGS. 8B, 9C), such as an adaptive structure. The structure 164 (see FIGS. 8B, 9C), such as an adaptive structure, comprises at least one trained shape memory alloy (SMA) workpiece 60a (see FIG. 3B), such as in the form of trained SMA actuator 62a (see FIG. 3B), having a generally planar transformational behavior 78 (see FIG. 11). The at least one trained SMA workpiece 60a, such as in the form of trained SMA actuator 62a (see FIG. 3B), is joined to the structure 164 (see FIGS. 8B, 9C), preferably a composite structure 165 (see FIGS. 8B, 9C) or a metal structure or another suitable structure. The structure 164 is preferably adaptable in response to a change in a temperature of the trained SMA workpiece 60a, such as the trained SMA actuator 62a.

The structure 164, such as the adaptive structure, preferably comprises a structural spar 30 (see FIG. 1), structural spar 44 (see FIG. 2), or structural spar 224 (see FIG. 8B), in an air vehicle 10 (see FIGS. 1, 2). The structural spar 30 (see FIG. 1), structural spar 44 (see FIG. 2), or structural spar 224 (see FIG. 8B) preferably has a closed cross-section, and as shown in FIG. 8B, includes at least two trained shape memory alloy (SMA) workpieces 60a, such as trained SMA actuators 62a, where the trained SMA workpieces 60a, such as trained SMA actuators 62a, are arranged substantially opposite one another. The at least one trained SMA workpiece 60a preferably comprises a trained SMA actuator 62a (see FIG. 8B) that is embedded in the structure 164 (see FIG. 8B) and is preferably configured to influence an aerodynamic surface of the structure 164. The at least one trained SMA workpiece 60a is preferably integrated into a trained shape memory alloy (SMA) actuator 62a (see FIGS. 8B, 9C) that may be bonded (see FIG. 8B), mechanically attached (see FIG. 9C), welded, fused, or otherwise suitably joined to the structure 164 and that influences a shape of the structure 164. The at least one trained SMA workpiece 60a, such as trained SMA actuator 62a, is preferably trained by applying a force couple 76 (see FIG. 11) to an SMA workpiece 60 (see FIG. 3A), such as trained SMA actuator 62a, to impart the generally planar transformational behavior 78 (see FIG. 11) to the SMA workpiece 60, such as trained SMA actuator 62a, and by applying thermal cycles 82 (see FIG. 11) to the SMA workpiece 60, such as SMA actuator 62, to produce a racking motion 79 (see FIGS. 3A, 3B) that changes a shape of the SMA workpiece 60, such as SMA actuator 62, from a substantially rectangle shape 75a (see FIG. 3A) to a substantially parallelogram shape 77a (see FIG. 3B).

Preferably, the structure 164, such as the adaptive structure, has an aerodynamic surface. The structure 164 may comprise one of a structural spar 30 (see FIG. 1) or portion of a structural spar 30 of a wing 14, 16 (see FIG. 1) of an air vehicle 10 (see FIG. 1) such as an aircraft 11 (see FIG. 1), a surface of a wing 16 (see FIG. 1) of an air vehicle 10 (see FIG. 1) such as an aircraft 11 (see FIG. 1), a structural spar 44 (see FIG. 2) or portion of a structural spar 44 of a rotor blade 40 (see FIG. 2) of an air vehicle 10 (see FIG. 2) such as a rotorcraft 34 (see FIG. 2), a surface of a rotor blade 40 (see FIG. 2) of an air vehicle 10 (see FIG. 2) such as a rotorcraft 34, an empennage 20 (see FIG. 1) of an aircraft 11 (see FIG. 1), a surface of an empennage 20 (see FIG. 1) of an aircraft 11 (see FIG. 1), an airfoil, or other aero and non-aero structures, components, and elements, including ground structures and ground based vehicles, water based structures, and other vehicles. The embedded, trained SMA actuator 62a may exert a force on the structure 164, and may influence, drive, or control the shape, such as an actuated shape, of the structure 164, such as the structural spar 30 of the wings 14, 16, or the structural spar 44 of the rotor blade 40, respectively, which, in turn, controls an actuated shape of the wings 14, 16 or the rotor blade 40. The trained SMA actuator 62*a* may be bonded to the structure 164 (see FIG. 6) or the trained SMA actuator 62*a* may be mechanically attached to the structure 164 (see FIGS. 9A-9C).

FIG. 5 shows a trained SMA workpiece 60*a*, such as in the form of trained SMA actuator 62*a*, that has been trained and that has been trimmed for integration into a structure 164, such as a structural spar 44 (see FIG. 2) of a rotor blade 40 (see FIG. 2). An actuator frame piece 162 may be trimmed from the trained SMA workpiece 60*a*, such as the trained SMA actuator 62*a*, and may be removed so that the trained SMA workpiece 60*a*, such as the trained SMA actuator 62*a*, may be joined, such as via mechanical attachment, to the structure 164, such as the structural spar 44 (see FIG. 2). The trained SMA workpiece 60*a*, such as the trained SMA actuator 62*a*, may also be trimmed and processed for bonding to the structure 164 (see FIG. 6), preferably a composite structure 165, a metal structure, or another suitable structure.

FIG. 6 is an illustration of an enlarged plan view of an embodiment of an SMA workpiece 60, such as in the form of SMA actuator 62, bonded to a composite structure 164 to form a bonded composite structure 165*a* (see also FIG. 11) prior to training and prior to installation into the training apparatus assembly 100 (see FIG. 4). If the SMA workpiece 60 has already been bonded to the structure 164 prior to training, then the structure 164 may be cut for layup into a component part. FIG. 6 shows the SMA workpiece 60, such as in the form of SMA actuator 62, with the first end 64, the second end 66, the first edge 68, and the second edge 70 and shows the structure 164 comprising a first structure 166*a* with an attachment edge 168*a* and a non-attachment edge 170*a*, and comprising a second structure 166*b* with an attachment edge 168*b* and a non-attachment edge 170*b*. As shown in FIG. 6, the first edge 68 of the SMA workpiece 60, such as in the form of SMA actuator 62, may be bonded to the attachment edge 168*a* of the first structure 166*a*, and the second edge 70 of the SMA workpiece 60, such as in the form of SMA actuator 62, may be bonded to the attachment edge 168*b* of the second structure 166*b*. Each of the first and second structures 166*a*, 116*b* may comprise structure interface openings 172. FIG. 6 further shows extended bonding regions 174 where the first end 68 and the second edge 70 of the SMA workpiece 60, such as in the form of SMA actuator 62, may extend farther across the structure 164.

FIGS. 7A-7G show embodiments of various training variants 180, such as in the form of training variants 180*a*-180*f*. FIG. 7A is an illustration of a plan view of an embodiment of a training variant 180, such as in the form of training variant 180*a* of the disclosure. FIG. 7A shows a baseline method where first edge 68 and second edge 70 of the SMA workpiece 60, for example, SMA actuator 62, are held or clamped by holding elements 116, such as in the form of clamps 118. A first free area 182 and a second free area 184 are not held or clamped and are free. The entire SMA workpiece 60, such as SMA actuator 62, may be heated during training. FIG. 7A further shows an applied force 186*a* along the second edge 70 that is clamped and shows a reactive force 188*a* along the first edge 68 that is clamped. The applied force 186*a* during training may always be present and substantially constant in magnitude. As shown in FIG. 7A, the second surface 74 of the SMA workpiece 60 is covered with heating elements 124, including the first free area 182 and the second free area 184. In the baseline method, the SMA workpiece 60, such as SMA actuator 62, is trained and when it is incorporated into a structure 164 (see FIG. 6), preferably a composite structure 165 (see FIG. 6), the structure 164 may preferably move according to how the trained SMA workpiece, such as the trained SMA actuator 62*a* (see FIG. 3B), influences or drives the shape of the structure 164. The applied force 186*a* indicates the force applied to the linear slide device 114 (see FIG. 4).

FIG. 7B is an illustration of a plan view of another embodiment of a training variant 180, in the form of training variant 180*b*, of the disclosure. FIG. 7B shows a training variant 180*b* where first edge 68 and second edge 70 of the SMA workpiece 60, for example SMA actuator 62, are held or clamped by holding elements 116, such as in the form of clamps 118. In this training variant 180*b*, as shown in FIG. 7B, the SMA workpiece 60, such as SMA actuator 62, is covered with heating elements 124 except for the first free area 182 and the second free area 184 which are not heated. Because the first free area 182 and the second free area 184 are not heated during training, the first free area 182 and the second free area 184 and first end 64 and second end 66 may not actuate as much as the middle portion that is covered with the heating elements 124. FIG. 7B further shows an applied force 186*b* along the second edge 70 that is clamped and shows a reactive force 188*b* along the first edge 68 that is clamped. The applied force 186*b* during training may always be present and substantially constant in magnitude. In this training variant 180*b*, heat is not applied at first free area 182 and second free area 184 to reduce stress in and proximate to these free areas.

FIG. 7C is an illustration of a plan view of yet another embodiment of a training variant 180, in the form of training variant 180*c*, of the disclosure. FIG. 7C shows training variant 180*c* having a frame element 194, such as in the form of a compliant material 196, and where the first end 64, the second end 66, the first edge 68 and the second edge 70 of the SMA workpiece 60, for example, SMA actuator 62, are held or clamped by holding elements 116 that are rigid, such as in the form of clamps 118, that form a compliance clamp around the frame element 194. In this training variant 180*c*, as shown in FIG. 7C, the entire SMA workpiece 60, such as SMA actuator 62, is covered with heating elements 124 but the frame element 194 formed of a compliant material 196 is not heated. The frame element 194 surrounds the SMA workpiece 60, such as SMA actuator 62, and the one or more rigid holding elements 116, such as rigid clamps 118, form a compliant clamp around the frame element 194. Although the entire SMA workpiece 60, such as SMA actuator 62, may be heated, the load on the SMA workpiece 60, such as SMA actuator 62, may be controlled by the compliant clamp. Compliance yields a desired strain profile 98 (see FIG. 11) or matches an embedded structure compliance. The compliant material 196 may be used with any of the embodiments of the training variants 180, such as in the form of training variants 180*a*-180*f*, as shown in FIGS. 7A-7G. In some embodiments, it may be desirable to apply the edge-wise racking loads 80 in a non-uniform manner. This may be accomplished by non-uniform clamping of the SMA workpiece 60, such as SMA actuator 62. For example, discrete portions of the first edge 68 (see FIG. 3A), the second edge 70 (see FIG. 3A), the first end 64 (see FIG. 3A), and/or the second end 66 (see FIG. 3A), may be clamped or unclamped, and/or materials or structures that transmit the applied force 186 or load, such as in the form of applied forces 186*a*-186*e* (see FIGS. 7A-7E) or loads, during training of the SMA workpiece 80 in a non-uniform or a tailored manner may be employed.

FIG. 7C further shows an applied force 186*c* along the second edge 70 that is clamped and shows a reactive force 188*c* along the first edge 68 that is clamped. The applied force 186*c* during training may always be present and substantially constant in magnitude. FIG. 7C further shows a reactive force 190 along the first end 64 and a reactive force 192 along a second end 66. In the training variant 180*c* shown in FIG. 7C, although the entire SMA workpiece 60, such as SMA actuator 62, is heated, the force is not being applied through the rigid holding elements 116, such as in the form of rigid clamps 118.

FIG. 7D is an illustration of a plan view of yet another embodiment of a training variant 180, in the form of training variant 180*d* of the disclosure. In this alternate training variant 180*d*, FIG. 7D shows a baseline method where first edge 68 and second edge 70 of the SMA workpiece 60, for example, SMA actuator 62, are held or clamped by holding elements 116, such as in the form of clamps 118. The first free area 182 and the second free area 184 are not held or clamped and are free. The entire SMA workpiece 60, such as SMA actuator 62, may be heated but the first free area 182 and second free area 184 may be overheated after training is completed to remove the strain actuation developed by training. FIG. 7D further shows an applied force 186*d* along the second edge 70 that is clamped and shows a reactive force 188*d* along the first edge 68 that is clamped. The applied force 186*d* during training may always be present and substantially constant in magnitude. In this training variant 180*d*, the SMA workpiece 60, such as SMA actuator 62, is trained and when it is incorporated into a structure 164 (see FIG. 6), preferably a composite structure 165 (see FIG. 6), the structure 164 will preferably move according to how the trained SMA workpiece 60*a*, such as trained SMA actuator 62*a* (see FIG. 3B), influences or drives the shape of the structure 164. The applied force 186*d* indicates the force applied to the linear slide device 114 (see FIG. 4).

FIG. 7E is an illustration of a plan view of yet another embodiment of a training variant 180, in the form of training variant 180*e* of the disclosure. FIG. 7E shows an alternate training variant 180*e* where the first end 64, the second end 66, the first edge 68, the second edge 70 of the SMA workpiece 60, for example, SMA actuator 62, are held or clamped by holding elements 116, such as in the form of clamps 118. However, corner portions 204 include hinge portions 198, which form a substantially four bar linkage. In this embodiment, load may be applied along the short ends, the long edges, or both the short ends and the long edges of the SMA workpiece 60, such as SMA actuator 62. The short end load application includes applying load to the short ends, such as first end 64 (see FIG. 7E) and second end 66 (see FIG. 7E). The long edge load application includes applying load to the long edges, such as first edge 68 (see FIG. 7E) and second edge 70 (see FIG. 7E). FIG. 7E shows an applied force 186*e* along the first end 64 that is clamped and shows a reactive force 188*e* along the second end 66 that is clamped. Further, a reactive force 200 along the second edge 70 and a reactive force 202 along the first edge 68 are shown in FIG. 7E. The applied force 186*e* during training may always be present and substantially constant in magnitude. The applied force 186*e* or load may be smaller in this alternate training variant 180*e*, and the alternate training variant 180*e* may simplify the build of a very long SMA workpiece 60, such as SMA actuator 62. This may be desirable to train a very long actuator that requires very large training loads. A method for training a long actuator is shown in FIG. 7E. A smaller load may be used because it is applied to the shorter side of the SMA workpiece 60, such as SMA actuator 62. The hinge portions 198 and the clamps 118 may be used to constrain the SMA workpiece 60, such as SMA actuator 62.

FIG. 7F is an illustration of an exploded side view of yet another embodiment of a training variant 180, in the form of training variant 180*f*, of the disclosure. FIG. 7G is an illustration of an assembled side view of the training variant 180*f* of FIG. 7F of the disclosure. FIG. 7F shows an alternate training variant 180*f* where the SMA workpiece 60, for example, SMA actuator 62, is sandwiched between deflection limiters 206*a*, 206*b*, such as in the form of metal plates, platens, or other suitable sandwiching devices. The deflection limiters 206*a*, 206*b* preferably provide a waviness deflection or out-of-plane deflection for limiting the height or extent of waviness or wavy shape 243 (see FIG. 10) during training of the SMA workpiece 60, for example, the SMA actuator 62. The deflection limiters 206*a*, 206*b* accommodate movement of the SMA workpiece 60, for example, the SMA actuator 62, and bear on the SMA workpiece 60, for example, the SMA actuator 62, prior to formation of any waviness. As shown in FIGS. 7F, 7G, the deflection limiter 206*a* is configured to apply an applied force (F applied) to the first surface 72 of the SMA workpiece 60, for example, SMA actuator 62, when the training variant 180*f* is in an assembled position 208 (see FIG. 7G), and the deflection limiter 206*b* is configured to apply an applied force (F applied) to the second surface 74 of the SMA workpiece 60, for example, SMA actuator 62, when the training variant 180*f* is in the assembled position 208 (see FIG. 7G). The applied force (F applied) during training may always be present and substantially constant in magnitude. In addition, any of the embodiments of the training variants 180*a*-180*e* discussed above and shown in FIGS. 7A-7E, may also be used with the deflection limiters 206*a*, 206*b* shown in FIGS. 7F, 7G.

In another embodiment of the disclosure, there is provided a shape memory alloy (SMA) actuator 62 (see FIG. 3A) for a structure 164 (see FIG. 6), preferably a composite structure 165 (see FIG. 6). The SMA actuator 62 may comprise a trained shape memory alloy (SMA) workpiece 60*a* (see FIG. 3B). The trained SMA workpiece 60*a* (FIG. 3B) preferably comprises a shape memory alloy (SMA) workpiece 60 (see FIG. 3A) that has been pre-processed and that has been trained by applying thermal cycles 82 (see FIG. 11) and strain cycles 84 (see FIG. 11) to the SMA workpiece 60 to impart a transformational behavior into the SMA workpiece 60 by producing a racking motion 79 (see FIGS. 3A-3B) to change a shape of the SMA workpiece 60 from a substantially rectangle shape 75*a* (see FIG. 3A) to a substantially parallelogram shape 77*a* (see FIG. 3B). The trained SMA workpiece 60*a* may be integrated into the SMA actuator 62. The SMA actuator 62 may be embedded in the structure 164 to influence a shape of the structure 164. Preferably, the pre-processed SMA workpiece 60 (see FIG. 3A) is trained via thermo-mechanical processing, where the strain cycles 84 (see FIG. 11) comprise edge-wise racking loads 80 (see FIG. 11) that impart a strain to the SMA workpiece 60, where the strain may be generally characterized as a shear strain. Preferably, at least one heating element 124 (see FIG. 5) is thermally connected to at least one portion of the SMA workpiece 60 to change a temperature of the SMA workpiece 60. The heat applied to the SMA workpiece 60 causes the SMA workpiece 60 to move in the racking motion 79.

The SMA workpiece 60 may be pre-processed by heat treating and shaping the SMA workpiece 60, cutting the SMA workpiece 60 to a desired shape and size, and subjecting the SMA workpiece 60 to one or more pre-processes of machining, chemical processing, cutting, surface treating, surface finishing, bonding, coating, plating, polishing, adding interface openings and fastener openings, or another suitable pre-process. Preferably, the structure 164 comprises one of a structural spar 30 (see FIG. 1) or a portion of a structural spar 30 of a wing 14, 16 (see FIG. 1) of an aircraft 11 (see FIG. 1), a surface of a wing 16 (see FIG. 1) of an aircraft 11 (see FIG. 1), a structural spar 44 (see FIG. 2)) or a portion of a structural spar 44 of a rotor blade 40 (see FIG. 2) of a rotorcraft 34 (see FIG. 2), a surface of a rotor blade 40 (see FIG. 2) of a rotorcraft 34, an empennage 20 (see FIG. 1) of an aircraft 11 (see FIG. 1), a surface of an empennage 20 (see FIG. 1) of an aircraft 11 (see FIG. 1), an airfoil, or other aero and non-aero structures, components, and elements, including ground structures and ground based vehicles, water based structures, and other vehicles. Preferably, the structure 164 has an aerodynamic surface. The embedded SMA actuator 62 with the trained SMA workpiece 60a may influence, drive, or control the shape, such as an actuated shape, of the structure 164, such as the structural spar 30 or structural spar 44, of the wings 14, 16 or the rotor blade 40, respectively, which, in turn, controls an actuated shape of the wings 14, 16 or the rotor blade 40. The SMA actuator 62 may be bonded to the structure 164 (see FIG. 6), the SMA actuator 62 may be mechanically attached to the structure 164 (see FIGS. 9A-9C), or the SMA actuator 62 may be welded, fused, or otherwise suitably joined to the structure 164.

In another embodiment of the disclosure, there is a system 222 (see FIG. 8B) that influences a shape of a wing 12, 14 (see FIG. 1) of an aircraft 11 (see FIG. 1) or a rotor blade 40 (see FIG. 2) of a rotorcraft 34 (see FIG. 2), or another suitable airfoil or aerodynamic surface of an air vehicle 10. The system 222 comprises a structural spar 224, as shown in FIG. 8B, that may be used in the wings 12, 14 (see FIG. 1) of the aircraft 11 (see FIG. 1) or the rotor blade 40 (see FIG. 2) of the rotorcraft 34 (see FIG. 2), or in another air vehicle 10 (see FIGS. 1, 2) or structure. The structural spar 224 preferably has one or more shape memory alloy (SMA) actuator assemblies 210 (see FIG. 8A) that may be integrated in the structural spar 224. Each SMA actuator assembly 210 comprises at least one trained SMA actuator 62a (see FIGS. 8A, 8B) embedded in at least one structure 164 (see FIGS. 8A, 8B), preferably a composite structure 165 (see FIGS. 8A, 8B). The system 222 further comprises a temperature control system 123 (see FIGS. 5, 11), such as in the form of a thermoelectric module (TEM) 214 (see FIGS. 8A-8C) attached to the structural spar 224 to control a temperature of the at least one trained SMA actuator 62a. The system 222 further comprises at least one heating element 124 (see FIGS. 5, 11) for applying heat to the at least one trained SMA actuator 62a to cause the structural spar 224 to influence a shape of the wings 14, 16 (see FIG. 1) of the aircraft 11 (see FIG. 1) or the rotor blade 40 (see FIG. 2) of the rotorcraft 34 (see FIG. 2). The at least one trained SMA actuator 62a preferably twists the wings 14, 16 (see FIG. 1) or the rotor blade 40 (see FIG. 2) for increased lift at slow air speed, and untwists the wings 14, 16 (see FIG. 1) or the rotor blade 40 (see FIG. 2) for improved fuel performance during forward flight. Each SMA actuator assembly 210 of the system 222, as discussed in detail below, may comprise the thermoelectric module (TEM) 214 (see FIG. 8C), a thermal connector 216 (see FIG. 8D) connecting the TEM 214 to the trained SMA actuator 62a, one or more elastomer portions 218 coupled to the TEM 214, and a heat sink 220 coupled to the TEM 214.

FIG. 8A is an illustration of an enlarged perspective side view of the shape memory alloy (SMA) actuator assembly 210 with an embodiment of the trained SMA workpiece 60a, such as the trained SMA actuator 62a, trained by one of the embodiments of the method 300 (see FIG. 12) of the disclosure. The trained SMA workpiece 60a, such as the trained SMA actuator 62a, is shown embedded into slots 212 of structures 164. The structure 164, such as in the form of composite structure 165, may be machined into a shape that allows bonding with a structural spar 224 (see FIG. 8B), such as an active structural spar, of a rotor blade 40 (see FIG. 2).

As shown in FIGS. 8A, 8C, the shape memory alloy (SMA) actuator assembly 210 may further comprise one or more thermoelectric modules (TEMs) 214 that may be used to heat and cool the shape memory alloy material, for example, NiTinol, of the trained SMA actuator 62a. FIG. 8C is an illustration of an enlarged perspective view of the dotted circle 8C of FIG. 8A showing the thermoelectric module (TEM) 214. As shown in FIG. 8C, the TEM 214 may comprise a heat pump thermocouple portion 228 attached to electrical current output portions 230. As shown in FIG. 8A, the TEM 214 may be attached to a heat sink 220 on one side, and may be thermally connected to the trained SMA workpiece 60a, such as in the form of the trained SMA actuator 62a, on the other side.

As shown in FIGS. 8A, 8D, the shape memory alloy (SMA) actuator assembly 210 may further comprise a thermal connector 216. The thermal connector 216 may be used to provide thermal connection and heat conduction between the TEM 214 and the trained SMA workpiece 60a, such as the trained SMA actuator 62a. FIG. 8D is an illustration of an enlarged perspective partial view of the dotted circle 8D of FIG. 8A showing the thermal connector 216. As shown in FIG. 8D, the thermal connector 216 may comprise a fiber portion 232 attached to a substrate 236. The fiber portion 232 may comprise a flexible fiber material 234, for example, a carbon fiber material, a carbon velvet material, or another suitable flexible fiber material. The substrate 236 may be comprised of vinyl, epoxy, composite, metal or another suitable substrate material. The thermal connector 216 may be positioned between the shape memory alloy material of the trained SMA workpiece 60a, such as the trained SMA actuator 62a, and the TEM 214 and allow motion between them.

As shown in FIG. 8A, the shape memory alloy (SMA) actuator assembly 210 may further comprise one or more elastomer portions 218 or other flexible structures or materials that may be used to close out the top of the SMA actuator assembly 210. Alternatively, it may be beneficial to move the TEM 214. For example, the TEM 214 may be moved to the interior face of the shape memory alloy material of the trained SMA workpiece 60a, such as the trained SMA actuator 62a, or may be attached to the non-moving embedded portion of the shape memory alloy material of the trained SMA workpiece 60a, such as the trained SMA actuator 62a.

FIG. 8B is an illustration of an enlarged perspective side view of the SMA actuator assembly 210 of FIG. 8A integrated into a structural spar 224 that may be used in a rotor blade 40 (see FIG. 2) of a rotorcraft 34 (see FIG. 2) or that may be used in a wing 14, 16 (see FIG. 1) of an aircraft 11 (see FIG. 1). The trained SMA actuator 62a may twist the rotor blade 40 for increased lift at slow air speed, and may untwist the rotor blade 40 for improved fuel performance during forward flight. As shown in FIG. 8B, an abrasion strip 226 may be used as the heat sink 220 if the TEM 214 is moved towards the abrasion strip 226, or it may be appended to the heat sink 220. Temperature sensors 128 (see FIG. 5) may be bonded onto the shape memory alloy material of the trained SMA workpiece 60a or in the structure 164 (see FIG. 6) in an area close to the shape memory alloy material of the trained SMA workpiece 60a, such as in the form of the trained SMA actuator 62a. If it is required to measure the strain, embedded fiber optic sensors (not shown) capable of sensing both temperature and strain may be used, as well as strain gages and thermocouples.

An example of a mechanically attached mechanical composite structure 165b is shown in FIGS. 9A-9C. FIG. 9A is an illustration of an enlarged partial view of one of the embodiments of a structure 164, preferably a composite structure 165 (see FIG. 9A), such as comprising first structure 166a and second structure 166b, and the trained SMA workpiece 60a, such as in the form of trained SMA actuator 62a, prior to mechanical attachment and integration. FIG. 9B is an illustration of an enlarged partial view of the structure 164, such as comprising first structure 166a and second structure 166b, and the trained SMA workpiece 60a, such as in the form of trained SMA actuator 62a, shown during mechanical attachment and integration by an installation operator 238.

As shown in FIGS. 9A-9B, the trained SMA workpiece 60a, such as in the form of trained SMA actuator 62a, may be slid through slots 212 of the structures 164 with the first surface 72 (see FIG. 9B) of the trained SMA workpiece 60a facing up. FIG. 9A shows the second surface 74 of the trained SMA workpiece 60a with the heating elements 124, the temperature sensors 128, and heat element wires 130, as well as fastener openings 158 and interface openings 160. As further shown in FIGS. 9A-9B, the structures 164, such as in the form of first structure 166a and second structure 166b, have slots 212 and structure interface openings 172. As shown in FIG. 9B, when the trained SMA workpiece 60a, such as in the form of trained SMA actuator 62a, is mechanically attached to the structures 164 to form the mechanically attached mechanical composite structure 165b, the trained SMA workpiece 60a, such as in the form of trained SMA actuator 62a, is preferably inserted through slots 212 of the structures 164 and the interface openings 160 on the outer interface area 156 (see FIG. 9A) of the trained SMA workpiece 60a, such as in the form of trained SMA actuator 62a, are preferably aligned with the structure interface openings 172 of the structures 164. Known mechanical fasteners (not shown) may be inserted through the aligned interface openings 160 (see FIG. 9A) and structure interface openings 172 (see FIG. 9A) and may be used to mechanically attach the trained SMA workpiece 60a, such as in the form of trained SMA actuator 62a, to the structures 164 to form the mechanically attached mechanical composite structure 165b (see FIG. 9A). Such known mechanical fasteners may be further used to mechanically attach the mechanically attached mechanical composite structure 165b to a structural spar 224 (see FIG. 9C).

FIG. 9C is an illustration of a side view of the structures 164 and the trained SMA workpieces 60a, such as in the form of trained SMA actuators 62a, that form the mechanically attached mechanical composite structure 165b of FIGS. 9A-9B shown after mechanical attachment and integration and shown integrated into the structural spar 224, such as an active structural composite spar.

For embodiments of the SMA workpiece 60 or trained SMA workpiece 60a, such as in the form of SMA actuator 62 or trained SMA actuator 62a, respectively, the shape of the SMA workpiece 60 or trained SMA workpiece 60a, may preferably be cut with an Electro-Discharge Machining (EDM) device into any shape or size (e.g., rectangular, elliptical, or another suitable shape) to perform as an actuator. This may be done after thermo-mechanical processing or before thermo-mechanical processing, if an appropriate training system 90 (see FIG. 11) with training apparatus assembly 100 (see FIG. 4) is designed. EDM cutting devices and processes may be preferable to use to minimize any residual stresses in the SMA workpiece 60 or trained SMA workpiece 60a, as compared to known cutting devices or processes where a large cutting force may be involved. Large actuation forces may require larger SMA workpieces 60. Larger SMA workpieces 60 may require more power or a longer time to actuate. The cross-sectional shape of the SMA workpiece 60 may be designed to minimize the total shape memory alloy material required, to fit into tight or compact spaces, and to produce the desirable actuation force and strain. The SMA workpiece 60 may be placed flat in the structure 164 (see FIG. 9C), or molded to conform to the shape of the structure 164.

Figure 10:
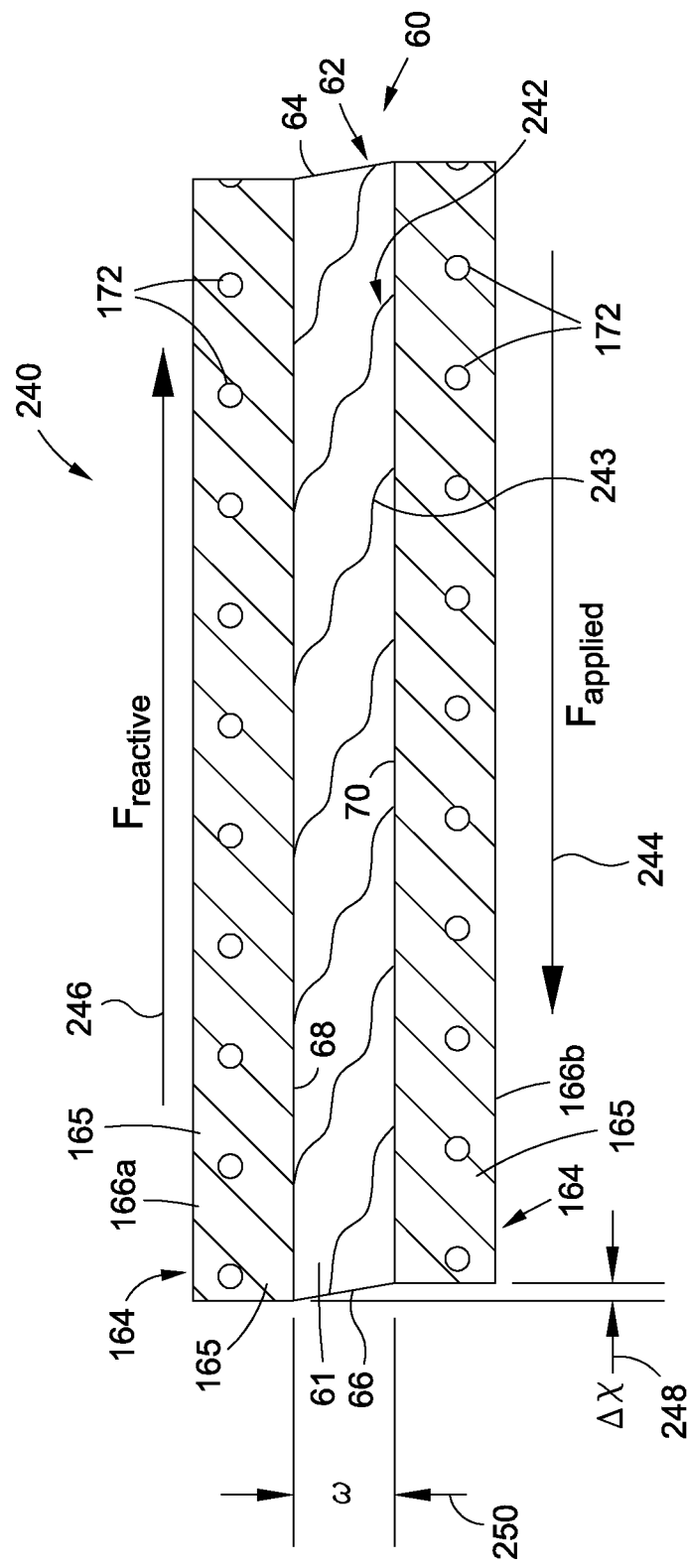
FIG. 10 is an illustration an enlarged plan view of an embodiment of a wavy shape SMA actuator of the disclosure.

Another embodiment of an SMA workpiece 60, such as in the form of SMA actuator 62, is shown in FIG. 10. FIG. 10 is an illustration of an enlarged plan view of an embodiment of a wavy shape SMA actuator 240 and attached structure 164, preferably a composite structure 165. FIG. 10 shows the wavy shape SMA actuator 240 with the SMA workpiece 60 having a wave-like deformation 242, such as in the form of a wavy shape 243. As used herein, "wavy shape" means a rippling or wrinkling effect. When load is applied to the SMA workpiece 60, such as in the form of SMA actuator 62, it produces the wavy shape 243 of the wavy shape SMA actuator 240. As shown in FIG. 10, the SMA workpiece 60, such as in the form of SMA actuator 62, may be attached to the structures 164 via bonding or mechanical attachment or another suitable attachment means. As further shown in FIG. 10, the first edge 68 of the SMA workpiece 60 may be attached to the first composite structure 166a, the second edge 70 of the SMA workpiece 60 may be attached to the second composite structure 166b. Further, an applied force 244 is applied along the second edge 70 and the second composite structure 166b, and a reactive force 246 is reacted against along the first edge 68 and the first composite structure 166a.

As shown in FIG. 10, the strain performance of the wavy shape SMA actuator 240 may be measured as the actuation strain percentage achieved while working against a load, such as the applied force 244. A load 96 (see FIG. 11) may be increased by increasing a thickness or length of the SMA workpiece 60. As shown in FIG. 10, a displacement output ($\Delta X$) 248 may be increased by increasing a width (w) 250 of the SMA workpiece 60. The displacement or strain percentage may be increased by using a non-uniform cross-section, such as that of the wavy shape SMA actuator 240 shown in FIG. 10. When the wavy shape SMA actuator 240 is heated, the waves of the wavy shape 243 (see FIG. 10) partially flatten, causing greater motion. This type of wavy shape SMA actuator 240 may be formed by placing the SMA workpiece 60 under a high load sufficient to cause buckling, or it may be formed during heat treating and shaping of the SMA workpiece 60. Non-rectangular cross-sections may be used to build an SMA workpiece 60 that may sustain a higher load before buckling. Fastener openings 158 (see FIG. 5) and interface openings 160 (see FIG. 5) may also be added to the wavy shape SMA actuator 240 to secure the SMA workpiece 60, such as in the form of SMA actuator 62, in the training apparatus assembly 100 (see FIG. 4), or to secure the trained SMA workpiece 60a, such as in the form of trained SMA actuator 62a, in the structure 164, such as a structural spar 30 (see FIG. 1), a structural spar 44 (see FIG. 2), a structural spar 224 (see FIG. 8B), or another suitable structure.

The actuation response time of the SMA workpiece 60, such as in the form of SMA actuator 62, may be dependent on the heat applied and the ability of the shape memory alloy to conduct heat. Typical shape memory alloys conduct heat minimally. For example, the thermal conductivity of NiTinol is approximately 25 times less than aluminum. The response time of the SMA workpiece 60 may be faster for a given input of heat energy applied per unit area because the SMA workpiece 60 mass may be distributed into a thin sheet. There may be more area to apply heat, and it may take less time for the heat to transfer into the SMA workpiece 60 because it is thin. The SMA workpiece 60 may preferably be porous to improve a force-to-weight ratio and this may lower the heating/cooling time.

A narrow heating band may be employed to speed the response time. As used herein, the term "heating range" means the temperature change required to fully transform from the martensite phase 86 (see FIG. 11) to the austenite phase 88 (see FIG. 11) in the temperature domain. Most rapid transformation of NiTinol may be seen within a 20% to 80% actuation range requiring only a small increase in temperature, as most of the heat may be used in phase transformation. Thus, if the SMA workpiece 60, such as in the form of SMA actuator 62, is held near a partial transformation regime of 10% to 20% until full transformation is commanded, then rapid heat is applied until the SMA workpiece 60, such as in the form of SMA actuator 62 (see FIG. 4), reaches 80% to 90% transformation, adequate actuation may be seen.

Shape control of the trained SMA actuator 62a may be realized by using multiple trained SMA actuators 62a or by heating/cooling only a portion of the shape memory alloy material. For example, multiple trained SMA actuators 62a placed in the structure 164 may be actuated independently from one another. Each trained SMA actuator 62a may produce a local bending or twisting of the structure 164 or other structure to which it is incorporated. Various morphed shapes may be produced by actuating different combinations of trained SMA actuators 62a. Alternatively, a single trained SMA actuator 62a may be heated such that temperature variations 125 (see FIG. 11), such as, for example, a temperature gradient, may be produced in the trained SMA actuator 62a. The degree of strain produced 94 (see FIG. 11) in the trained SMA actuator 62a may be dependent on the local temperature. Controlling the temperature variations 125, such as in the form of the temperature gradient, may allow control of a strain profile 98 (see FIG. 11) across the trained SMA actuator 62a. This may allow for control of the shape of the structure 164 (see FIG. 11) or other structure that the trained SMA actuator 62a is embedded in.

As discussed above, FIG. 11 shows the training system 90 that may be used in the training of the SMA workpiece 60, such as in the form of SMA actuator 62, having a load 96 and a strain profile 98. As shown in FIG. 11, the training system 90 further comprises a training variant 180 (see also FIGS. 7A-7G). As shown in FIG. 11, the training system 90 further comprises a structure 164 (see FIG. 6), such as a composite structure 165, that may include a bonded composite structure 165a (see FIG. 6) and a mechanical composite structure 165b (see FIG. 9B). As shown in FIG. 11, the training system 90 further comprises the training apparatus assembly 100 (see also FIG. 4) having the load applying device 102 (see also FIG. 4), such as the ram device 104 or linear actuator 105. As shown in FIG. 11, the training system 90 further comprises the slide device 112 (see also FIG. 4), such as in the form of the linear slide device 114 (see FIG. 4). One or more applied loads 186 (see FIG. 11) may be applied to the linear slide device 114 (see FIG. 4) by the load applying device 102 (see FIGS. 4, 11).

As shown in FIG. 11, the training system 90 further comprises two or more holding elements 116, such as in the form of clamps 118 (see FIG. 4), to hold the SMA workpiece 60, such as in the form of SMA actuator 62, in the training apparatus assembly 100. The holding elements 116 may react to one or more reactive loads 188 (see FIG. 11) from the linear slide device 114 (see FIG. 4), as a result of the one or more applied loads 186 applied to the linear slide device 114 (see FIG. 4) from the load applying device 102.

As shown in FIG. 11, the training system 90 further comprises a temperature control system 123 (see also FIG. 5) comprising one or more heating elements 124 and for controlling temperature variations 125 (FIG. 11) and thermal cycles 82 (see FIG. 11). As shown in FIG. 11, the training system 90 further comprises a controller device 132 (see also FIG. 5) comprising a computer device 134 that may include a processing unit 136 for running and processing software 138.

As shown in FIG. 11, the training system 90 further comprises a performance measuring system 92 comprising performance measuring elements 140 (see also FIG. 4) that preferably measure the motion and performance of the SMA workpiece 60, such as in the form of SMA actuator 62. The strain produced 94 (see FIG. 11) by the motion may be measured by the performance measuring elements 140. When training is complete, the trained SMA workpiece 60a, such as in the form of trained SMA actuator 62a, may be activated by heating and cooling, and the performance 108 (see FIG. 11) of the trained SMA workpiece 60a, such as in the form of trained SMA actuator 62a, may be measured using the performance measuring elements 140 (see FIG. 11), and performance measurements 110 (see FIG. 11) may be recorded and analyzed.

Any number of other systems may be included. Although an aerospace example is shown, the principles of the disclosure may be applied to other industries, such as the automotive industry.

Disclosed embodiments of the method 300 (see FIG. 12) and training system 90 (see FIG. 11), as compared to existing methods and systems, encompass the following advantageous features: they provide a trained shape memory alloy (SMA) workpiece 60a (see FIG. 3B), such as a trained SMA actuator 62a (see FIG. 3B), that may be joined to a structure 164 (see FIG. 9C), preferably a composite structure 165 (see FIG. 9C), or that may be integrated or embedded in the structure 164, where the structure 164 may comprise a structural spar 30 (see FIG. 1) or a portion of the structural spar 30, a structural spar 44 (see FIG. 2) or a portion of the structural spar 44, or a structural spar 224 (see FIG. 9C) or a portion of the structural spar 224, of wings 14, 16 (see FIG. 1), rotor blades 40 (see FIG. 2), or other aerodynamic surfaces with minimal or no impact on the size and weight of the structure; they provide for control of the shape of wings 14, 16 (see FIG. 1), rotor blades 40 (see FIG. 2), and other aerodynamic control surfaces with minimal or no impact on the size and weight of the structure; they provide for manufacturing of trained SMA workpieces 60a, such as trained SMA actuators 62a capable of influencing structures; they provide for methods to integrate, distribute and control the actuated shape of structures; they provide for embedding the trained SMA workpiece 60a, such as in the form of trained SMA actuator 62a, in aerodynamic surfaces; they provide for taking aerodynamic structures and changing their shapes in a non-linear fashion, and allowing for morphing the aerodynamic structures; they provide for a training system 90 for training an SMA workpiece 60, such as in the form of SMA actuator 62, and thus, the use of known electromagnetic actuators and known shape memory alloy actuators, such as SMA twist tube actuators and/or SMA actuators or components for actuators using trained wires, tubes and plates, may be avoided or minimized, which, in turn, may decrease the weight of the structure and air vehicle, and which, in turn, may decrease fuel costs incurred by the air vehicle during operation.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of training a shape memory alloy (SMA) workpiece, the method comprising:
    applying a force couple to the shape memory alloy (SMA) workpiece to impart a generally planar transformational behavior to the SMA workpiece to obtain a trained shape memory alloy (SMA) workpiece, the force couple comprising applying opposing forces such that edge-wise racking loads are applied to the SMA workpiece.

2. The method of claim 1 wherein applying the opposing forces comprises applying an applied force and a reactive force to the SMA workpiece.

3. The method of claim 1 wherein applying the force couple comprises applying opposing forces such that a wave-like deformation is produced in the SMA workpiece.

4. The method of claim 1 wherein applying the force couple comprises applying opposing forces that impart a non-wavy to wavy transformational behavior to change a shape of the SMA workpiece from a non-wavy shape to a wavy shape.

5. The method of claim 1 further comprising:
    applying thermal cycles to the SMA workpiece; and,
    applying the force couple in a cyclic manner thereby imparting substantially planar strain cycles to the SMA workpiece to cause the SMA workpiece to have the generally planar transformational behavior.

6. The method of claim 5 wherein applying the thermal cycles comprises applying heat to the SMA workpiece to produce a racking motion that changes a shape of the SMA workpiece from a substantially rectangle shape to a substantially parallelogram shape.

7. The method of claim 1 further comprising joining the trained SMA workpiece to one or more structures.

8. The method of claim 7 wherein the one or more structures are capable of changing shape in response to a change in temperature of the trained SMA workpiece.

9. The method of claim 1 further comprising integrating the trained SMA workpiece into an SMA actuator and embedding the SMA actuator in a structural spar of an air vehicle to influence a shape of the structural spar.

10. A method of training a shape memory alloy (SMA) actuator, the method comprising:
    applying a force couple in a cyclic manner to the shape memory alloy (SMA) actuator to impart substantially planar strain cycles to the SMA actuator, to cause the SMA actuator to have a generally planar transformational behavior;
    applying thermal cycles to the SMA actuator, wherein applying the thermal cycles comprises applying heat to the SMA actuator to produce a racking motion that changes a shape of the SMA actuator from a substantially rectangle shape to a substantially parallelogram shape; and
    obtaining a trained shape memory alloy (SMA) actuator.

11. The method of claim 10 wherein applying the force couple comprises applying opposing forces such that a wave-like deformation is produced in the SMA actuator.

12. The method of claim 10 wherein applying the force couple comprises applying opposing forces that impart a non-wavy to wavy transformational behavior to change a shape of the SMA actuator from a non-wavy shape to a wavy shape.

13. The method of claim 10 further comprising joining the trained SMA actuator to one or more structures.

14. The method of claim 13 wherein the one or more structures are capable of changing shape in response to a change in temperature of the trained SMA actuator.

15. The method of claim 13 wherein the one or more structures comprise one or more structural spars used in an aircraft or a rotorcraft.

16. The method of claim 10 wherein applying the force couple in a cyclic manner comprises applying a predetermined stress level in a range of 25 ksi (one thousand pounds per square inch) to 35 ksi, and wherein applying the thermal cycles comprises repeatedly heating the SMA actuator for at least 500 cycles to 1000 cycles.

17. A method of training a shape memory alloy (SMA) actuator, the method comprising:
    applying a force couple in a cyclic manner to the shape memory alloy (SMA) actuator to impart substantially planar strain cycles to the SMA actuator, to cause the SMA actuator to have a generally planar transformational behavior;
    applying thermal cycles to the SMA actuator, wherein applying the thermal cycles comprises applying heat to the SMA actuator to produce a racking motion that changes a shape of the SMA actuator from a substantially square shape to a substantially rhombus shape; and
    obtaining a trained shape memory alloy (SMA) actuator.

18. The method of claim 17 further comprising joining the trained SMA actuator to one or more structures.

19. The method of claim 18 wherein the one or more structures are capable of changing shape in response to a change in temperature of the trained SMA actuator.

20. The method of claim 18 wherein the one or more structures comprise one or more structural spars used in an aircraft or a rotorcraft.

* * * * *